United States Patent
Chindapol et al.

(10) Patent No.: US 8,295,209 B2
(45) Date of Patent: Oct. 23, 2012

(54) FRAME STRUCTURES WITH FLEXIBLE PARTITION BOUNDARY FOR WIRELESS NETWORKS

(75) Inventors: Aik Chindapol, Washington, DC (US); Andrea Bacioccola, Helsinki (FI); Zexian Li, Espoo (FI); Roberto Albanese, Helsinki (FI)

(73) Assignee: Nokia Corporation, Espoo (FI)

( * ) Notice: Subject to any disclaimer, the term of this patent is extended or adjusted under 35 U.S.C. 154(b) by 408 days.

(21) Appl. No.: 12/035,262

(22) Filed: Feb. 21, 2008

(65) Prior Publication Data

US 2009/0213766 A1  Aug. 27, 2009

(51) Int. Cl.
H04B 7/005  (2006.01)

(52) U.S. Cl. ........ 370/278; 370/210; 370/281; 370/329; 370/336

(58) Field of Classification Search .................. 370/278, 370/281, 329, 350; 455/422
See application file for complete search history.

(56) References Cited

U.S. PATENT DOCUMENTS

| | | | |
|---|---|---|---|
| 6,272,117 B1 | 8/2001 | Choi et al. | |
| 6,711,416 B1 | 3/2004 | Zhang | |
| 6,990,090 B2 | 1/2006 | Meier | |
| 7,113,495 B2 | 9/2006 | Furukawa | |
| 7,646,752 B1 | 1/2010 | Periyalwar et al. | |
| 2002/0018448 A1 | 2/2002 | Amis et al. | |
| 2002/0080736 A1 | 6/2002 | Furukawa | |
| 2002/0102948 A1 | 8/2002 | Stanwood et al. | |
| 2002/0191573 A1 | 12/2002 | Whitehill et al. | |
| 2003/0091014 A1 | 5/2003 | Meier | |
| 2004/0025018 A1 | 2/2004 | Haas et al. | |
| 2004/0109493 A1 | 6/2004 | Blessent et al. | |
| 2004/0170147 A1 | 9/2004 | Take | |
| 2005/0058151 A1 | 3/2005 | Yeh | |
| 2005/0064818 A1* | 3/2005 | Assarsson et al. | 455/41.2 |
| 2005/0117539 A1 | 6/2005 | Song et al. | |
| 2005/0232183 A1 | 10/2005 | Sartori et al. | |
| 2005/0286547 A1 | 12/2005 | Baum et al. | |
| 2006/0029011 A1 | 2/2006 | Etemad et al. | |

(Continued)

FOREIGN PATENT DOCUMENTS

DE  10053809 A1  5/2002

(Continued)

OTHER PUBLICATIONS

WiMAX Forum, WiMAX FDD Proposal for Rel 1.x, Motorola (Oct. 2007).

(Continued)

*Primary Examiner* — David Oveissi

(74) *Attorney, Agent, or Firm* — Squire Sanders (US) LLP

(57) ABSTRACT

Various example embodiments are disclosed herein. According to an example embodiment, an apparatus may include a wireless interface, and a controller, the apparatus being configured to: transmit a downlink subframe of a frequency division duplex (FDD) frame to one or more mobile stations in a wireless network, each wireless station being assigned to one of a plurality of groups, such as, for example, one of group 1 or group 2, the downlink subframe including at least: a group 1 portion and a group 2 portion, wherein a group boundary between the group 1 portion and the group 2 portion of the downlink subframe is variable, at least one of the group 1 portion and the group 2 portion including a group boundary information identifying a location of the group boundary or a location of the group 2 portion in the downlink subframe.

9 Claims, 16 Drawing Sheets

Frame 200

U.S. PATENT DOCUMENTS

| | | | |
|---|---|---|---|
| 2006/0107166 | A1 | 5/2006 | Nanda |
| 2006/0176973 | A1 | 8/2006 | Alamouti et al. |
| 2007/0076663 | A1 | 4/2007 | Qi et al. |
| 2007/0097945 | A1 | 5/2007 | Wang et al. |
| 2007/0110016 | A1 | 5/2007 | Shen et al. |
| 2007/0121546 | A1 | 5/2007 | Zuckerman et al. |
| 2008/0002610 | A1 | 1/2008 | Zheng et al. |
| 2008/0039014 | A1 | 2/2008 | Tsai et al. |
| 2008/0056193 | A1 | 3/2008 | Bourlas et al. |
| 2008/0069067 | A1* | 3/2008 | Sood et al. ............. 370/342 |
| 2008/0075184 | A1 | 3/2008 | Muharemovic et al. |
| 2008/0089309 | A1* | 4/2008 | Groleau et al. ............. 370/342 |
| 2008/0117854 | A1 | 5/2008 | Saifullah et al. |
| 2008/0247375 | A1 | 10/2008 | Muharemovic et al. |
| 2008/0268844 | A1 | 10/2008 | Ma et al. |
| 2008/0291847 | A1 | 11/2008 | Zheng |
| 2009/0092066 | A1 | 4/2009 | Chindapol et al. |
| 2009/0092067 | A1* | 4/2009 | Sudarshan et al. ............. 370/281 |
| 2009/0219841 | A1 | 9/2009 | Sudarshan et al. |
| 2009/0268645 | A1 | 10/2009 | Chindapol et al. |
| 2009/0325578 | A1 | 12/2009 | Li et al. |
| 2010/0008326 | A1 | 1/2010 | Albanese et al. |
| 2010/0177717 | A1 | 7/2010 | Sung et al. |

FOREIGN PATENT DOCUMENTS

| | | |
|---|---|---|
| EP | 1389853 A1 | 2/2004 |
| EP | 1524800 A2 | 4/2005 |
| EP | 1912390 A1 | 4/2008 |
| WO | 99/14897 A2 | 3/1999 |
| WO | 00/55640 A1 | 9/2000 |
| WO | 2006/096728 A2 | 9/2006 |
| WO | 2008/004062 A2 | 1/2008 |
| WO | 2008/004062 A8 | 1/2008 |
| WO | 2008/004066 A2 | 1/2008 |
| WO | 2008/004062 A3 | 4/2008 |
| WO | 2008/047203 A2 | 4/2008 |
| WO | 2008/047203 A3 | 6/2008 |
| WO | 2008/004066 A3 | 7/2008 |
| WO | 2009/047709 A2 | 4/2009 |
| WO | 2009/047709 A3 | 8/2009 |

OTHER PUBLICATIONS

WiMAX Forum, DL/UL Offset FDD/H-FDD Frame Structure for Release 1.x: Harmonized Proposal, Alcatel-Lucent (Oct. 2, 2007).
IEEE P802.16Rev2/D2 Draft Standard for Local and metropolitan area networks, Part 16: Air Interface for Broadband Wireless Access Systems (Dec. 2007).
Non-Final Office Action for U.S. Appl. No. 12/049,265, mailed on Jul. 22, 2010, 25 pages.
"DL/UL Offset FDD/H-FDD Frame Structure for Release 1.x: Harmonized Proposal", WiMAX Forum on Alcatel-Lucent, Oct. 2, 2007, pp. 1-9.
"Part 16: Air Interface for Broadband Wireless Access Systems", Draft Standard for Local and Metropolitan Area Networks, IEEE Computer Society P802.16Rev2/D2, Dec. 2007, pp. 114-536 (Section 6.3), 742-1079 (Section 8.4) and 1107-1263 (Section 11).
International Search Report and Written Opinion for International Application No. PCT/IB2008/054113, mailed on Jun. 19, 2009, 16 pages.
"Part 16: Air Interface for Broadband Wireless Access Systems", IEEE WirelessMAN, Draft Standard for Local and metropolitan area networks, IEEE Computer Society, IEEE Microwave Theory and Techniques Society, Jun. 2008, 83 pages.
"R1.x FDD/Full Duplex-Current status and open issues", WiMAX Forum, Mar. 12, 2008, 15 pages.
"R1.x FDD/HFDD Ad Hoc Mar. 2008 Recommendation to TWG", WiMAX Forum, Mar. 14, 2008, 5 pages.
U.S. Appl. No. 12/035,262, filed Feb. 21, 2008, titled Frame Structures With Flexible Partition Boundary for Wireless Networks.
U.S. Appl. No. 12/049,265, filed Mar. 14, 2008, titled Techniques for Link Utilization for Half-Duplex and Full-Duplex Stations in a Wireless Network.
Axnas, J., et al., "Final report on identified RI key technologies system concept and their assessment", IST-2003-507581 Winner, D2.10 version 1.0, Dec. 23, 2005, pp. 1-2, 38-39, 83-96.

Bacioccola, Andrea, et al., "R1.x FDD/Full Duplex—Current status and open issues", WiMAX Forum, Nokia, Mar. 15, 2008, 15 pages.
Bacioccola, Andrea, et al., "R1.x FDD/Full Duplex-Current Status and Open Issues", WiMAX Forum, Nokia and NSN, Apr. 15, 2008, 8 pages.
Bacioccola, Andrea, et al., "R1.x FDD/Full Duplex-Current status and open issues", WiMAX Forum, Mar. 12, 2008, 15 pages.
Bacioccola, Andrea, et al., "R1.x FDD/Full Duplex-Current Status", WiMAX Forum, Nokia, NSN and Huawei, Apr. 15, 2008, 13 pages.
Campbell, Andrew T., et al., "Spawning Networks", IEEE Network, IEEE Inc. Jul./Aug. 1999, pp. 16-29.
Chion, Mary, et al., "Fix for Problems in UL Allocation", IEEE 802.16 Broadband Wireless Access Working Group, Jun. 12, 2005, 4 pages.
Schultz, D., et al., "Proposal of the best suited deployment concepts for the identified scenarios and related RAN protocols", IST-2003-507581, Winner, D3.5, version 1.0, May 1, 2006, 160 pages.
European Search Report for EP Application No. EP 02018385, mailed on Jan. 29, 2003, 3 pages.
Gal, Dan, "Support of Full Duplex MS (OFDMA FDD) in draft IEEE 802.16Rev2/D4", WiMAX Forum, Alcatel-Lucent, Apr. 7, 2008, pp. 1-6.
"Part 16: Air Interface for Fixed Broadband Wireless Access Systems", IEEE Standard for Local and metropolitan area networks, IEEE Computer Society, IEEE Microwave Theory and Techniques Society, IEEE Std 802.16-2004, Oct. 1, 2004, 894 pages.
Jang, Heejin, et al., "Mobile IPv6 Fast Handovers Over IEEE 802.16e Networks", MIPSHOP Working Group, Internet-Draft, Nov. 16, 2007, pp. 1-18.
Johnson, David B., et al., "Dynamic Source Routing in Ad Hoc Wireless Networks", Computer Science Department, Carnegie Mellon University, 1996, 18 pages.
Kim, Kyung-Ah, et al., "A Seamless Handover Mechanism for IEEE 802.16e Broadband Wireless Access", School of Electrical Engineering and Computer Science, Seoul National University, Seoul, Republic of Korea, Feb. 28, 2005, pp. 1-8.
Marks, Roger, "IEEE Standard 802.16: A Technical Overview of the WirelessMAN Air Interface for Broadband Wireless Access", IEEE 802.16 Broadband Wireless Access Working Group, Jun. 4, 2002, 12 pages.
McBeath, Sean, et al., "DCD/UCD Consideration for FDD", WiMAX Forum, Huawei, 2006, 5 pages.
McBeath, Sean, et al., "Serving F-FDD Mobile Stations v2", WiMAX Forum, Huawei, 2006, 5 pages.
Otyakmaz, Arif, et al., "Parallel operation of half- and full -duplex FDD in future multi-hop mobile radio networks", IEEE Explorer, 14th European Wireless Conference, EW 2008, Jun. 22, 2008, pp. 1-7.
Pabst, Ralf, et al., "Realy-Based Deployment Concepts for Wireless and Mobile Broadband Radio", IEEE Communications Magazine, Wireless World Research Forum, Sep. 2004, pp. 80-89.
Saifullah, Yousuf, et al., "Clarification on CDMA Codes TLV", IEEE 802.16 Broadband Wireless Access Working Group, Nokia Siemens Networks, Jul. 13, 2007, pp. 1-3.
Saifullah, Yousuf, et al., "Resource Request for Bandwidth", IEEE 802.16 Presentation Submission Template (Rev 8.3), Nokia, Nov. 15, 2006, 8 pages.
Saifullah, Yousuf, et al., "Resource Request for Bandwidth", IEEE 802.16 Broadband Wireless Access Working Group, Nokia, Jan. 18, 2007, 9 pages.
Schultz, D., et al., "Proposal of the best suited deployment concepts for the identified scenarios and related RAN protocols", IST-2003-507581, Winner, D3.5, version 1.0, May 1, 2006,pp. 1-2, 58-67, and 93-97.
Seol, Ji-Yun, "Rel1.x FDD/HFDD Flexible UL allocation signaling for F-FDD MS in H-FDD frame structure", WiMAX Forum, Samsung Electronics, Apr. 2008, pp. 1-9.
Villela, Daniel, et al., "Virtuosity: Programmable Resource Management for Spawning Networks", Computer Networks, Elsevier Science Publishers B.V., Amsterdam, NL, vol. 36, No. 1, Jun. 2001, pp. 1-29.

Wiemann, Henning, et al., "A Novel Multi-Hop ARQ Concept", IEEE, 61st Conference on Vehicular Technology, VTC 2005-Spring, Jun. 1, 2005, pp. 3097-3101.

Xu, Allan, et al., "R1.x FDD/Full Duplex Additional Option for 2 MAP Approach", WiMAX Forum, Huawei, Apr. 28, 2008, 4 pages.

Yaghoobi, Hassan, "R1.5 FDD/HFDD Ad Hoc Apr. 2008 Opening Report", WiMAX Forum, Intel Corporation, Apr. 28, 2008, 5 pages.

Zheng, Haihong, et al., "HARQ with Relays", IEEE 802.16 Presentation Submission Template (Rev 8.3), Nov. 7, 2006, 12 pages.

Zheng, Haihong, et al., "Transmission Scheme of MAC Management Message towards a RS Group in multi-hop relay System", IEEE 802.16 Broadband Wireless Access Working Group, Nokia, Jan. 8, 2007, 9 pages.

Israeli Office Action for Israel Application No. 195928, mailed on Feb. 24, 2010, 2 pages.

Russian Office Action for Russian Application No. 2009117689, mailed on Aug. 13, 2010, 5 pages.

"Part 16: Air Interface for Fixed and Mobile Broadband Wireless Access Systems", Multihop Relay Specification, Baseline Document for Draft Standard for Local and Metropolitan Area Networks, IEEE 802.16j-06/026r4, Jun. 6, 2007, 203 pages.

U.S. Appl. No. 10/089,426, filed Mar. 29, 2002, 101 pages.

Non-Final Office Action Response for U.S. Appl. No. 12/049,265, filed Jan. 18, 2011, 15 pages.

Final Office Action for U.S. Appl. No. 12/049,265, mailed on Mar. 18, 2011, 19 pages.

IEEE, "6.3.2.3.5 Ranging Request (RNG-REQ) message", Air Interface for Fixed Broadband Wireless Access Systems, IEEE Std 802.16-2004, 2004, p. 49.

Non-Final Office Action for U.S. Appl. No. 12/111,958, mailed Apr. 1, 2011, 29 pages.

Notice of Allowance received for U.S. Appl. No. 12/049,265, mailed on Oct. 13, 2011, 20 pages.

Final Office Action received for U.S. Appl. No. 12/111,958, mailed on Jan. 5, 2012, 21 pages.

Non Final Office Action received for U.S. Appl. No. 12/163,084, mailed on Oct. 27, 2011, 11 pages.

Non Final Office Action received for U.S. Appl. No. 12/498,634, mailed on Oct. 4, 2011, 34 pages.

Non-Final Office Action Response filed for U.S. Appl. No. 12/111,958, filed on Sep. 1, 2011, 16 pages.

* cited by examiner

FRAME STRUCTURES WITH FLEXIBLE PARTITION BOUNDARY FOR WIRELESS NETWORKS

TECHNICAL FIELD

This description relates to wireless networks.

BACKGROUND

In wireless networks, different techniques have been proposed to allocate various media resources to users. One example allocation technique includes Frequency Division Duplexing (FDD), where uplink (UL) transmissions (e.g., from a mobile station to a base station) may occur on a first carrier frequency (or frequencies), and downlink (DL) transmissions (e.g., from a base station to a mobile station) may occur on a second carrier frequency (or frequencies). FDD may offer a relatively efficient use of channel resources. Base stations (BSs), Access Points (APs) or other infrastructure nodes may typically be Full Duplex-FDD (FD-FDD), in which the BSs may transmit and receive at the same time (but on different frequencies). However, many types of mobile stations (MSs) or subscriber stations may be Half Duplex-FDD (HD-FDD) devices, which may either transmit or receive at one time (but typically not both), and may alternate between periods of downlink receiving, and uplink transmission (on different frequencies). Mobile stations in a wireless network may even be divided up into two groups to provide a more efficient use of channel resources, so that both the uplink carrier frequency and the downlink carrier frequency may be used at the same time, at least in some cases. For example, during one time period, a first group of mobile stations may receive in a downlink direction, while a second group of mobile stations is allowed to transmit in an uplink direction to the AP or infrastructure node. Then, during a second time period, the first group may transmit and the second group may receive. Such an arrangement of HD-FDD mobile stations, being divided into two groups and alternating receiving and transmitting, may also have challenges in maintaining synchronization between at least some of the mobile stations and the AP or infrastructure node.

SUMMARY

According to an example embodiment, a method may include transmitting a downlink subframe of a frequency division duplex (FDD) frame to one or more mobile stations in a wireless network, each wireless station being assigned to a group out of at least 2 groups, the at least 2 groups including at least a group 1 and a group 2, the downlink subframe including at least: a group 1 portion and a group 2 portion, wherein a group boundary between the group 1 portion and the group 2 portion of the downlink subframe is variable, at least one of the group portions including a group boundary information identifying a location of the group boundary or a location of the group 2 portion in the downlink subframe.

According to another example embodiment, an apparatus may include a wireless interface or wireless transceiver, and a controller, the apparatus being configured to: transmit a downlink subframe of a frequency division duplex (FDD) frame to one or more mobile stations in a wireless network, each wireless station being assigned to either group 1 or group 2, the downlink subframe including at least: a group 1 portion and a group 2 portion, wherein a group boundary between the group 1 portion and the group 2 portion of the downlink subframe is variable, both the group 1 portion and the group 2 portion including a group boundary information identifying a location of the group boundary or a location of the group 2 portion in the downlink subframe.

According to another example embodiment, a mobile station may be assigned to a second group out of a plurality of groups including at least a first group and a second group of mobile stations in the wireless network, wherein a method may include: receiving, by the mobile station, a downlink control information associated with the first group of mobile stations, the downlink control information including a location of, or pointer to, the group boundary information, obtaining the group boundary information, obtaining the group boundary information, determining, based on the group boundary information, a location of a downlink control information associated with the second group, and receiving the downlink control information associated with the second group.

According to another example embodiment, a method may be provided of receiving information by a mobile station in a wireless network, the mobile station being assigned to a second group out of a first group and a second group of mobile stations in the wireless network. In an example embodiment, the method may include receiving, by the mobile station, a downlink control information associated with the first group of mobile stations, the downlink control information including a group boundary information of a downlink subframe, determining, based on the group boundary information, a location of a downlink control information associated with the second group, and receiving the downlink control information associated with the second group.

According to another example embodiment, an apparatus may be provided at a mobile station in a wireless network. The mobile station may be assigned to a second group out of a first group and a second group of mobile stations in the wireless network. In an example embodiment, the apparatus may include a wireless interface (or wireless transmitter/receiver), and a controller. The apparatus may be configured to receive, by the mobile station, a downlink control information associated with the first group of mobile stations, the downlink control information including a group boundary information of a downlink subframe, determine, based on the group boundary information, a location of a downlink control information associated with the second group, and receive the downlink control information associated with the second group.

According to another example embodiment, a method may include receiving, by a mobile station in a wireless network, at least a portion of a first group portion of a downlink subframe of a frequency division duplex (FDD) frame, the downlink subframe include a first group portion and a second group portion, the mobile station being assigned to a second group associated with the second group portion of the downlink subframe, and determining a location of the second group portion of the downlink subframe based on information included in the first group portion.

According to another example embodiment, a method may be provided of synchronizing a mobile station in a wireless network, the mobile station being assigned to a second group out of a first group and a second group of mobile stations in the wireless network. In an example embodiment, the method may include waking, by the mobile station, from a low power state, receiving a downlink control information of a first group portion of a downlink subframe, the downlink subframe also including a second group portion, the downlink control information of the first group portion including a group boundary information identifying a location or resources for a group boundary between the first group portion and the second group portion or identifying a location or resources of the second group portion, wherein a group boundary between the first group portion and the second group 2 portion of the downlink subframe is variable, and determining a location or resources of a downlink control information of the second group, based on the downlink control information of the first group.

According to another example embodiment, an apparatus may be provided in a mobile station in a wireless network. The mobile station may be assigned to a second group out of a first group and a second group of mobile stations in the wireless network. The apparatus may include a wireless interface (e.g., wireless transmitter and receiver), and a controller, the apparatus configured to: wake from a low power state; receive a downlink control information of a first group portion of a downlink subframe, the downlink subframe also including a second group portion, the downlink control information of the first group portion including a group boundary information identifying a location or resources for a group boundary between the first group portion and the second group portion or identifying a location or resources of the second group portion, wherein a group boundary between the first group portion and the second group 2 portion of the downlink subframe is variable; and determine a location or resources of a downlink control information of the second group, based on the downlink control information of the first group.

According to another example embodiment, a method may include sending, from a mobile station in a wireless network, a synchronization request message to a target base station, receiving a synchronization response message from the target base station, the synchronization response message including a group assignment for the mobile station and a group boundary information, wherein the group boundary information identifies a location of a boundary between a first group portion and a second group portion of a downlink subframe or identifies a location of the second group portion, and receiving, based on the group boundary information, a downlink control information associated with the group to which the mobile station is assigned.

According to another example embodiment, a method may include receiving, by the mobile station, a fixed location downlink control information, the fixed location downlink control information including location information identifying a location of a variable location downlink control information, determining, based on the location information, a location of the variable location downlink control information, and receiving the variable location downlink control information.

According to another example embodiment, a method may include transmitting a downlink subframe of a frequency division duplex (FDD) frame to one or more mobile stations in a wireless network, the downlink subframe including at least: a fixed location downlink control information, and a variable location downlink control information, wherein a location of the variable location downlink control information may vary or change. In an example embodiment, the fixed location downlink control information may include location information identifying the location of the variable location downlink control information either within a current FDD frame or a future FDD frame.

According to another example embodiment, a method may include transitioning, by a mobile station in a wireless network, from a low power or idle mode to an active mode, receiving, by the mobile station, a fixed location portion of a downlink subframe, the fixed location portion including at least a paging message addressed to the mobile station and location information identifying a location of a variable location portion of the downlink subframe, and determining that a base station or other infrastructure node has data pending for the mobile station based on the paging message in the fixed location portion.

According to another example embodiment, a method may include determining, by a mobile station in a wireless network, whether a location of a variable location portion of a downlink subframe is known, receiving, by the mobile station, if the location of the variable location portion is known, the variable location portion of the downlink subframe, otherwise, if the location of the variable location portion of the downlink subframe is not known, then performing the following: receiving a fixed location portion of the downlink subframe, the fixed location portion including location information identifying the location of the variable location portion for a current or future frame; determining, based on the location information, the location of the variable location portion; and receiving, based on the determined current location, for a current or future frame, the variable location portion of a downlink subframe.

According to another example embodiment, a method may include transmitting, from a base station, a fixed boundary frame including a first downlink control portion provided at a fixed location and a second downlink control portion provided at a default location in the fixed boundary frame, and transmitting, from the base station in a wireless network, a variable boundary frame including a third downlink control portion provided at the fixed location in the variable boundary frame and a fourth downlink control portion provided at a variable location of the variable boundary frame. In an example embodiment, the second downlink control portion of the fixed boundary frame may include boundary information identifying a location of the fourth downlink control portion of the variable boundary frame.

According to yet another example embodiment, a method may include receiving, at a mobile station in a wireless network, a fixed boundary frame including a first group downlink control portion provided at a fixed location and a second group downlink control portion provided at a default location in the fixed boundary frame, wherein the second group downlink control portion of the fixed boundary frame includes boundary information identifying a location of a second group downlink control portion of a variable boundary frame, determining a location of the second group downlink control portion of the variable boundary frame based on the boundary information in the fixed boundary frame, and receiving, at the mobile station based on the determining, the second group downlink control portion of the variable boundary frame.

The details of one or more implementations are set forth in the accompanying drawings and the description below. Other features will be apparent from the description and drawings, and from the claims.

DETAILED DESCRIPTION

Figure 1:
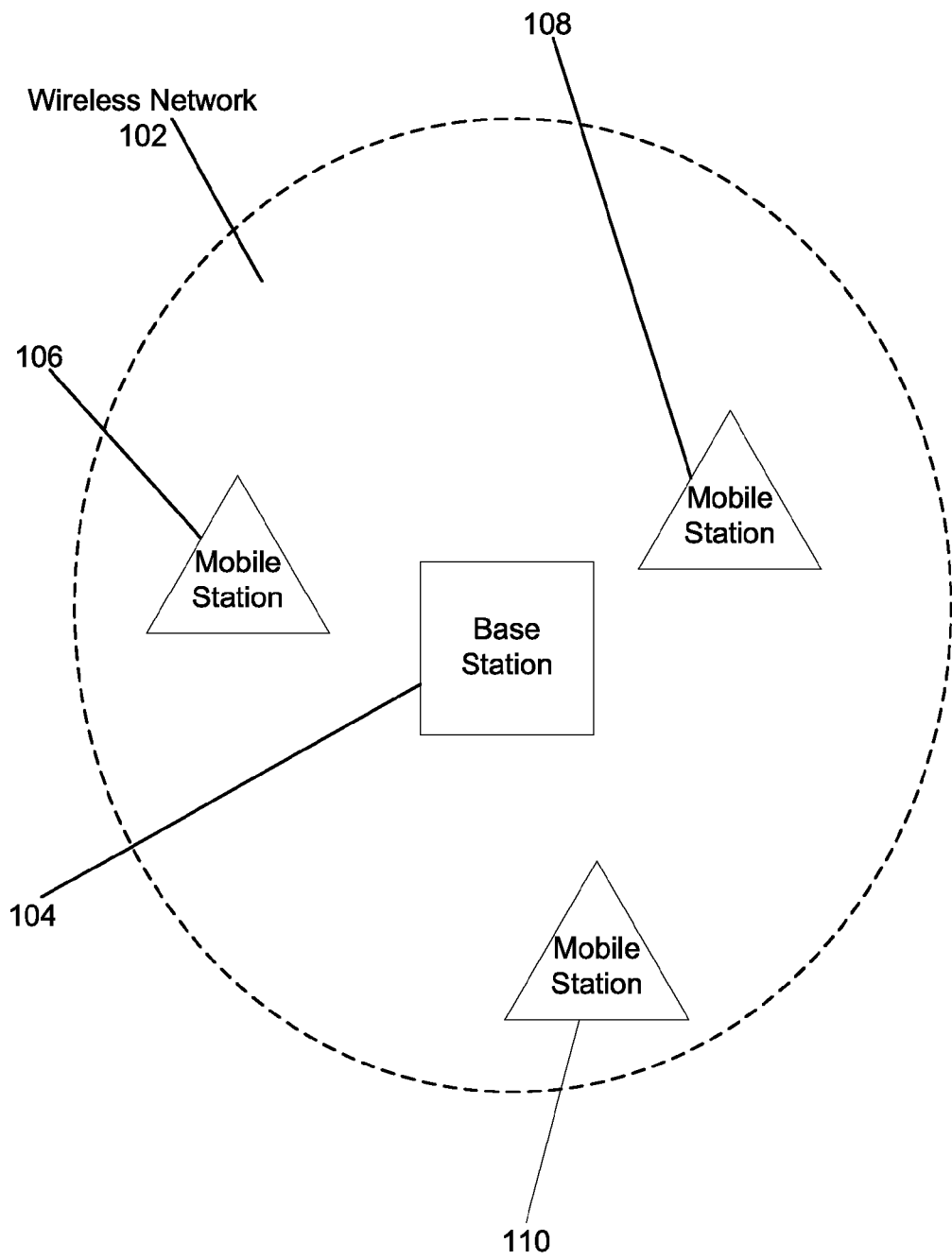
FIG. 1 is a block diagram of a wireless network according to an example embodiment.

FIG. 1 is a block diagram of a wireless network 102 including a base station, 104 and three mobile stations 106, 108, 110 according to an example embodiment. Although not shown, mobile stations 106, 108 and 110 may be coupled to base station 104 via relay stations or relay nodes, for example. The wireless network 102 may include, for example, an IEEE 802.16 Wireless Metropolitan Area Network (WiMAX), an IEEE 802.11 Wireless Local Area Network (WLAN), a 3GPP Long Term Evolution (LTE) network, or a cellular telephone network, according to example embodiments, or other wireless network. The base station 104 may include a cellular or WiMAX base station (BS), a node B, an 802.11 access point, or other infrastructure node, according to various example embodiments. The term "base station" (BS) may be used herein and may include any type of infrastructure node. The mobile stations 106, 108, 110 may include laptop or notebook computers, smartphones, personal digital assistants (PDAs), cellular telephones, a WiMAX device, a LTE device, a WLAN device, subscriber station, or any other wireless device, according to example embodiments. The term "wireless node" may include any type of wireless node, such as base stations, mobile stations, etc. While the present disclosure may use some of the terminology of WiMAX or other wireless standards for purposes of explanation or to provide examples, the present disclosure may be applicable to any networking or wireless technologies.

In an example embodiment, the wireless network 102 may use Frequency Division Duplexing (FDD), where signals or data may be transmitted in a downlink direction from BS 104 to one or more of mobile stations (MSs) 106, 108, 110 via a first frequency or carrier frequency (f1) or set of frequencies, and signals or data may be transmitted in an uplink direction from each of mobile stations (MSs) 106, 108, 110 to BS 104 via a second carrier frequency (e.g., f2) or set of frequencies. For example, BS 104 may be FD-FDD, MSs 106, 108 and 110 may be either Full Duplex-FDD (FD-FDD) or Half Duplex-FDD (HD-FDD). However, in an example embodiment, one or more of the mobile stations may be HD-FDD.

According to an example embodiment, the mobile stations 106, 108, 110 may be assigned to either Group 1 of mobile stations (or a first group of mobile stations), or Group 2 of mobile stations (or a second group). For example, MSs 106 and 108 may be assigned to Group 1, while MS 110 may be assigned to Group 2. At network entry, for example, BS 104 may assign the new MS to one of the two groups, e.g., to balance the groups or substantially achieve load balancing across the two groups, or the MS may randomly select to belong to one of the groups, as another example. Dividing the MSs into two or more groups may allow HD-FDD devices or stations to collectively use both uplink and downlink frequencies or channels at the same time. Each Group may include any number of MSs. For example, during a first time period, Group 1 mobile stations may receive data in a downlink direction and Group 2 may transmit in an uplink direction, while during a second time period, Group 1 may transmit and Group 2 may receive, as an example.

Figure 2:
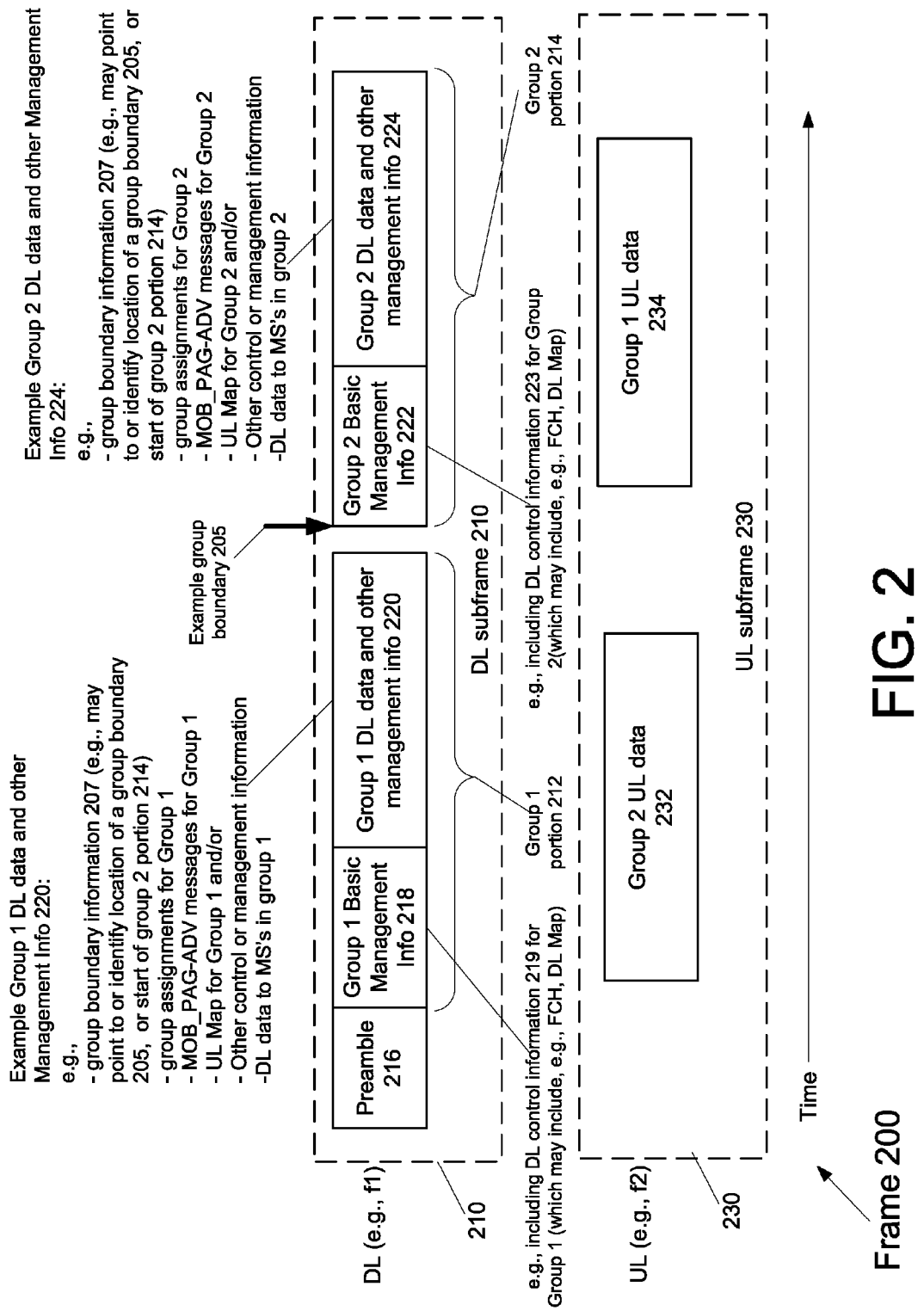
FIG. 2 is a diagram illustrating an example embodiment of a frame that may be used for a Frequency Division Duplexing (FDD) system.

FIG. 2 is a diagram illustrating an example embodiment of a frame that may be used for a Frequency Division Duplexing (FDD) system. Frame 200 may be an example of a FDD frame, and may have a variable or selectable length or period, e.g., 5 ms, or other length. The BS 104 may select the length of the frame 200, for example. Frame 200 may include a DL (downlink) subframe 210 that may include signals transmitted via a first carrier frequency (f1) in a downlink (DL) direction, e.g., from a base station (such as from BS 104) to one or more mobile stations (e.g., MSs, 106, 108, 110). Frame 200 may also include an UL (uplink) subframe 230 that may include signals transmitted via a second carrier frequency (f2) in an UL direction from one or more mobile stations to a base station (e.g., to BS 104).

The frame 200 illustrates operation of an example of a FDD system in which one or more mobile stations (e.g., MSs 106, 108, 110) may receive signals via a first frequency (e.g., f1) or set of frequencies within a DL subframe 210, and may transmit signals to a base station (e.g., BS 104) via a second frequency (e.g., f2) or set of frequencies within an UL frame 230. The DL subframe 210 and the UL subframe 230 may be provided or transmitted at the same time, or during overlapping time periods during a frame, since different carrier frequencies are used for DL and UL transmissions. As noted above, in an example embodiment, a plurality of mobile stations (e.g., MSs 106, 108, 110, . . . ) communicating with base station 104 may be assigned to one of two (or more) groups (e.g., assigned to Group 1 or Group 2). This Group assignment may indicate the time or order for which a MS may transmit and receive (e.g., Group 1 to receive via f1 and Group 2 to transmit via f2 during a first portion of frame 200, while Group 1 to transmit via f2 and Group 2 to receive via f1 during a second portion of frame 200, as an example).

As shown in FIG. 2, DL subframe 210 may include a common preamble 216, which may be received by both Group 1 and Group 2 mobile stations, e.g., which may be used by Group 1 and 2 MSs for synchronization, or to identify a beginning of frame 200. After preamble 216, the DL subframe 210 may include a Group 1 portion 212 and a Group 2 portion 214. Group 1 portion 212 may include a Group 1 basic management information 218 and a Group 1 DL data and other management information 220, for example. In an example embodiment, the Group 1 basic management information 218 may include basic management information that most (or even all) Group 1 MSs should receive and decode, at least in normal operation. The Group 1 basic management information 218, may include, for example, downlink (DL)

control information 219 for Group 1. In an example embodiment, the DL control information 219 for Group 1 may include a Frame control Header (FCH) which may identify a coding scheme and modulation rate for the rest of Group 1 basic management information 218 and a DL Map. In an example embodiment, the DL Map (e.g., within DL control information 219) for Group 1 may, for example, provide information related to other items within Group 1 portion 212 (e.g., to identify a location and other parameters for the other items included within Group 1 DL data and other management information 220).

Group 1 portion 212 of DL subframe 210 may also include a Group 1 DL data and other management information 220, which may be provided after the Group 1 Basic management information 218 (or DL control information 219). The Group 1 DL data and other management information 220 may include, for example: an UL control information (e.g., a UL Map) that may identify channel resources that will be allocated in an UL subframe of a future frame 200 (e.g., in a next frame 200) to allow specific Group 1 MSs to transmit UL to BS 104; DL data transmitted to one or more Group 1 MSs; and other management or control information, such as, for example, paging messages (e.g., MOB_PAG-ADV messages) directed to specific MSs indicating that BS 104 has data pending for transmission to the identified MS. As described in greater detail below, in an example embodiment, the Group 1 DL data and other management information 220 may also include Group assignments (or re-assignments if changed) for one or more MSs (e.g., for Group 1 MSs), and a group boundary information 207 which may identify a group boundary between Group 1 portion 212 and Group 2 portion 214, for example. Other control or management information may also be included in field 220. A Group 1 portion 212 and a downlink control information 219 for Group 1 may be associated with Group 1 (or first group) of mobile stations.

Group 1 basic management information 218 may include a DL control information 219 for Group 1. The DL control information 219 (which for example, may include a DL Map) for Group 1 may include a list of all Group 1 MSs for which DL data is being transmitted in the current frame, and may include, for each DL data transmission, e.g., the MS CID (MS connection identifier) to which the data is directed or addressed to, an identification of the allocated channel resources for the DL data transmission (e.g., time or time slot, frequency or subcarrier(s) or location information (e.g., symbol offset) for the DL transmission, and possibly a coding rate/modulation scheme used for the DL data transmission. Each Group 1 MS may receive and decode the Group 1 DL control information 219 to determine if DL data is being sent to the MS (based on MS CID in DL control information), and if so, the symbol offset and coding rate/modulation scheme may be used by the MS to locate and then decode the DL data from BS 104.

The DL control information 219 may, for example, also identify the presence and/or allocated resources or location (e.g., symbol offset), and modulation scheme/coding rate within DL subframe 210 (e.g., within field 220) for each of several other information items, such as paging messages (e.g., MOB_PAG-ADV messages), Group assignments (or re-assignments if changed) for one or more MSs (e.g., for Group 1 MSs), and for a group boundary information 207. DL control information 219 for Group 1 may also include group boundary information 207, in an example embodiment. In various example embodiments, the Group boundary information 207 may be provided at various locations or within various portions of DL control information 219, such as within a FCH (frame control header), a DL Map, or as within other control message(s) that may be included in DL control information 219.

In one example embodiment, the DL control information 219 (e.g., the DL Map, FCH, or other control messages within DL control information 219) may include the group boundary information 207 (in this case, the DL control information 219 may identify the location of the group boundary 205). In another example embodiment, DL control information 219 may include a location of or pointer to the group boundary location information 205, which may be provided within Group 1 portion 212. For example, the group boundary information 205 may be included within Group 1 DL data and other management information 220.

Likewise, a Group 2 portion 214 of DL subframe 210 may have a format that is the same or very similar to Group 1 portion 212, but is provided with respect to or for Group 2. A Group 2 portion 214 and a downlink control information 223 for Group 2 may be associated with Group 2 (or first group) of mobile stations. Group 2 portion 214 may include a Group 2 basic management information 222 and a Group 2 DL data and other management information 224. Group 2 basic management information 222 may include basic management information that most (or even all) Group 2 MSs should receive and decode, e.g., at least under normal operation. The Group 2 basic management information 222, may include, for example, downlink (DL) control information 223 for Group 2. In an example embodiment, the DL control information 223 for Group 2 may include a Frame control Header (FCH) which may identify a coding scheme and modulation rate for the rest of Group 2 basic management information 222 and a DL Map. In an example embodiment, the DL Map (e.g., within DL control information 223) for Group 2 may, for example, provide information related to other items within Group 2 portion 214 (e.g., to identify a location and other parameters for the other items included within Group 2 DL data and other management information 224).

The Group 2 DL data and other management information 224 may include, for example: an UL control information (such as an UL Map) that may identify resources that will be allocated in an UL subframe of a future frame 200 (e.g., in a next frame 200) to allow specific MSs of Group 2 to transmit UL to BS 104; DL data transmitted to one or more Group 2 MSs; and other management or control information, such as, for example, paging messages (e.g., MOB_PAG-ADV messages) directed to specific MSs of Group 2 indicating that BS 104 has data pending for transmission to the identified MS. In an example embodiment, the Group 2 DL data and other management information 224 may also include, for example, group assignments/re-assignments for one or more MSs (e.g., of Group 2), and group boundary information 207.

For example, Group 2 basic management information 218 may include a DL control information 223 for Group 2. The DL control information 223 for Group 2 may include a list of all Group 2 MSs for which DL data is being transmitted in the current frame, and may include, for each DL data transmission, e.g., the MS CID (MS connection identifier) to which the data is directed or addressed to, an identification of the allocated channel resources for the DL data transmission (e.g., time or time slot, frequency or subcarrier(s)) or location information (e.g., symbol offset) for the DL transmission, and possibly a coding rate/modulation scheme used for the DL data transmission. Each Group 2 MS may receive and decode the Group 2 DL control information 223 (e.g., DL Map for Group 2) to determine if DL data is being sent to the MS (based on MS CID in DL control information 223), and if so, the symbol offset and coding rate/modulation scheme may be used by the MS to locate and then decode the DL data from BS 104.

The DL control information 223 for Group 2 may, for example, (e.g., as a DL Map or other control information) also identify the presence and/or allocated resources or location (e.g., symbol offset), and modulation scheme/coding rate within DL subframe 210 (e.g., within field 224) for each of several other information items, such as paging messages (e.g., MOB_PAG-ADV messages) for Group 2, Group assignments (or re-assignments if changed) for one or more MSs (e.g., for Group 2 MSs), and for a group boundary information 207. DL control information 223 for Group 2 may also include group boundary information 207, in an example embodiment. In various example embodiments, the Group boundary information 207 may be provided at various locations or within various portions of DL control information 223 or Group 2, such as within a FCH (frame control header), a DL Map for Group 2, or as within other control message(s) that may be included in DL control information 223.

In one example embodiment, the DL control information 223 (e.g., the DL Map, FCH, or other control messages within DL control information 223) for Group 2 may include the group boundary information 207 (e.g., where the DL control information 223 may identify the location of the group boundary 205 of a future frame 200). In another example embodiment, DL control information 223 (e.g., DL Map within DL control information 223) may include a location of or pointer to the group boundary location information 207, which may be provided within Group 2 portion 214. For example, the group boundary information 207 may be included within Group 2 DL data and other management information 224, or at other location or within other information in DL subframe 210.

Referring to FIG. 2, UL subframe 230 of frame 200 may include a Group 2 UL data 232 and a Group 1 UL data 234, which may provide resources (e.g., time/subcarrier resources or OFDMA symbols) for one or more Group 2 MSs to transmit data UL to BS 104 (for Group 2 UL data 232) or for one or more Group 1 MSs to transmit data UL to BS 104 (for Group 1 UL data 234). Group 2 UL data 232 may at least partially overlap in time with Group 1 portion 212, while Group UL data 234 may at least partially overlap in time with Group 2 portion 214.

According to an example embodiment, during normal operation, MSs may typically receive or detect the preamble 216, receive and decode their Group-specific DL control information (DL control information 219 for Group 1 MSs, and DL control information 223 for Group 2 MSs), and then, based on the DL control information, receive DL data (and other control/management information if present) and determine the UL transmission resources (e.g., time, frequency or symbol offset) for UL transmissions.

According to an example embodiment, a BS 104 may vary or change the group boundary 205 (or the lengths of Group 1 portion 212 and Group 2 portion 214). For example, if more DL data is being transmitted to Group 2 (than to Group 1), then Group 2 portion 214 may be increased, and Group 1 portion 212 may be decreased of DL subframe 210. Thus, BS 104 may move or vary a group boundary 205, which may, for example, be a boundary between Group 1 portion 212 and Group 2 portion 214, a start of Group 2 portion (or start of Group 2 basic management information), or other location between the end of Group 1 portion 212 and beginning of Group 2 portion 214, as examples. The exact location of the group boundary 205 may vary in different implementations.

For example, a gap may (or may not) be provided between Group 1 portion 212 and Group 2 portion 214, in different example embodiments. In an example embodiment, Group 2 portion 214 may include a group boundary information 207 that identifies the location (e.g., symbol offset) of the group boundary 205 (e.g., for a future frame 200).

When the group boundary 205 is changed by BS 104, the BS 104 may change or update the group boundary information 207, e.g., to notify the MSs of the new group boundary 205. For example, in some cases, it may not be necessary, for Group 1 MSs, to include the group boundary information 207 within Group 1 portion 212, since the length of preamble 216 may typically be fixed, and the Group 1 DL control information 219 may (in an example embodiment) immediately follow the preamble 219. Thus, (for Group 1 MSs), the location of the DL control information 219 for Group 1 does not typically change even when the group boundary changes, according to an example embodiment. However, the start location of the DL control information 223 for Group 2 may change when the group boundary changes, the group boundary information 207 may typically be provided within Group 2 portion 214, according to an example embodiment. The boundary information 207 may identify a location of group boundary 205 for a current frame, or for a specific future frame (e.g., next frame, two frames ahead, . . . ).

Thus, DL control information 219 for Group 1 (within a fixed Group 1 DL portion 212) may be considered to be a fixed location downlink control information since information 219 may typically follow after preamble 216, or be at a fixed or predictable location within the frame 200, for example. On the other hand, the location of DL control information 223 for Group 2 may vary or change, e.g., as the group boundary 205 changes. Thus, the DL control information 223 for Group 2 may be considered to be a variable location DL control information 223 (within a variable location Group 2 DL portion 214).

In other example embodiment, more than two Groups may be provided, e.g., three Groups, four Groups, . . . . In such case, the locations of one or more of the DL control information and Group portion for one or more of these groups may have a variable location. For example, Group 1 portion 212 (and corresponding DL control information 219 for Group 1) may be at a fixed location, e.g., after preamble 216 or other location. On the other hand, the location of other Group portions may change or vary, e.g., selected by a BS 104.

Under normal operation (e.g., when MS is synchronized with BS 104, such as when a MS knows the location of the current group boundary 205), a Group 1 MS may typically receive or detect the preamble 216, and then decode the DL control information 219 (or Group 1 Basic management information 218) for Group 1. Based on the DL control information 219 for Group 1 (e.g., FCH and/or DL Map for Group 1), the Group 1 MS may then receive and decode any DL data and control information in this frame or a future frame (e.g., if signaled by BS 104) or an assigned reception allocation, and may determine the allocation of any channel resources for UL transmission for this MS during an assigned reception allocation or frame (e.g., future frame). A group assignment in Group 1 portion 212 may indicate that a MS is assigned to Group 1, or has been reassigned to Group 2, for example. As noted above, in an example embodiment, a change in the location of group boundary 205 may not typically change the start location of DL control information 219 (or Group 1 basic management information 218), since the DL control information 219 for Group 1 may immediately follow the fixed length preamble 216, according to an example embodiment.

Also, under normal operation, (e.g., when MS is synchronized with BS 104, such as when the MS knows the location of the current group boundary 205), a Group 2 MS may typically receive or detect the preamble 216, and then decode the DL control information 223 for Group 2 (or Group 2 Basic management information 222). Based on the DL control information 223 for Group 2, the Group 2 MS may then receive and decode any DL data and control information in this frame, and may determine the allocation of any channel resources for UL transmission for this Group 2 MS during a next or future frame 200. A group assignment field (not shown) in Group 2 portion 214 (e.g., within field 224) may indicate that a MS is assigned to Group 2, or a MS in Group 2 has been reassigned to Group 1, for example. A change in the location of group boundary 205 may change the start location of DL control information 223 (or Group 2 basic management information 222) in a future frame 200, according to an example embodiment. Thus, it may be advantageous to provide the group boundary information 207 within Group 2 portion 214 of a DL subframe 210 (e.g., for every frame, periodically, occasionally), so that Group 2 MSs will be notified when BS 104 changes location or symbol offset for the group boundary 205.

However, in some situations, a Group 2 MS may lose synchronization with BS 104, e.g., may not have (or know) the current group boundary 205. For example, a coding error or noise may cause a DL subframe to be received as an uncorrectable error, and thus, the Group 2 MS in such case may have inaccurate group boundary information (e.g., if the lost frame provided a changed or updated group boundary 205). As another example where a MS may lose the current group boundary (or may have inaccurate group boundary information), a MS may enter a low power mode, such as sleep mode, or idle mode. While the MS is in such a low power mode, the BS 104 may change the location of the group boundary, but a frame including the updated group boundary information 207 may not be received by the MS in a low power mode. When the MS resumes from the low power mode, it may attempt to receive or decode the DL control information (E.g., FCH, DL Map, or other control messages/information within DL control information 223) for Group 2 at the last known group boundary 205. This may cause an error (e.g., since the DL control information or group boundary 205 may have been moved by BS 104), and the MS may eventually need to perform network re-entry to re-synchronize with the BS 104, which may be time consuming or inefficient.

Therefore, according to an example embodiment, to allow a Group 2 MS to perform a fast recovery from an asynchronous (or unsynchronized) state, the group boundary information 207 may also be provided in the Group 1 portion 212 of the DL subframe 210. In such an example embodiment, a MS resuming power from a sleep mode (sleep mode-to-active mode transition), or attempting to recover from a lost group boundary 205, may receive and decode DL control information 219 (e.g., including a FCH and DL Map or other control information) for Group 1 to obtain the location or symbol offset for the group boundary information 207 provided within the Group 1 portion 212 of DL subframe 210 (e.g., in an example embodiment, the location or symbol offset may be provided within either the FCH, DL Map or other control information or messages within DL control information 223). Or alternatively, DL control information 219 may actually include the group boundary information 207 (e.g., within either the FCH, DL Map or other control information or messages within DL control information 223). As noted, the start of DL control information 219 is typically known (even when the group boundary 205 is unknown), since the field 218 or DL control information 219 for Group 1 portion 212 may typically immediately follow the fixed-length preamble 216. Based on the DL control information 219 for Group 1, the Group 2 MS may then receive and decode the group boundary information 207. The group boundary information 207 may be included in the DL control information 219. Alternatively, the group boundary information may be provided in information field 220 of Group 1 portion 212, where the Group 2 MS may obtain a pointer or location (from DL control information 219) to the location of the group boundary information 207.

In an example embodiment, the group boundary information 207 may identify a location of (e.g., symbol offset measured from start of preamble 216) or point to the group boundary 205, from which the start of the DL control information 223 for Group 2 may be determined (e.g., start of DL control information 223 may be same as group boundary 205, or may be a known offset therefrom or other location). Thus, by placing a copy of the group boundary information 207 in the Group 1 portion 212, (although not necessarily used by Group 1 MSs), this may allow a Group 2 MS to recover or obtain the current group boundary 205 (e.g., recover synchronization with BS 104). The group boundary information 207 may be provided in Group 1 portion 212 and in Group 2 portion 214, every frame, or periodically (e.g., every other frame), or other arrangement. In one example embodiment, the BS 104 may provide the group boundary information in Group 2 portion 214 less frequent than in Group 1 portion 212, e.g., to save bandwidth. Based on the group boundary 205, the Group 2 MS may then determine the location of the DL control information 223 for Group 2 (e.g., start of DL control information 223 may coincide with the group boundary 205, or may be a known offset from the group boundary 205). The Group 2 MS may then receive and decode the Group 2 DL control information 223. The DL control information 223 for Group 2 may provide the locations (e.g., time/frequency or OFDMA symbols) and target MSs of Group 2 DL data transmissions and identify allocated channel resources (e.g., time/frequency or OFDMA symbols) for UL data transmissions for Group 2. Alternatively, the group boundary information 207 may be provided only in the Group 1 portion 212.

Figure 3:
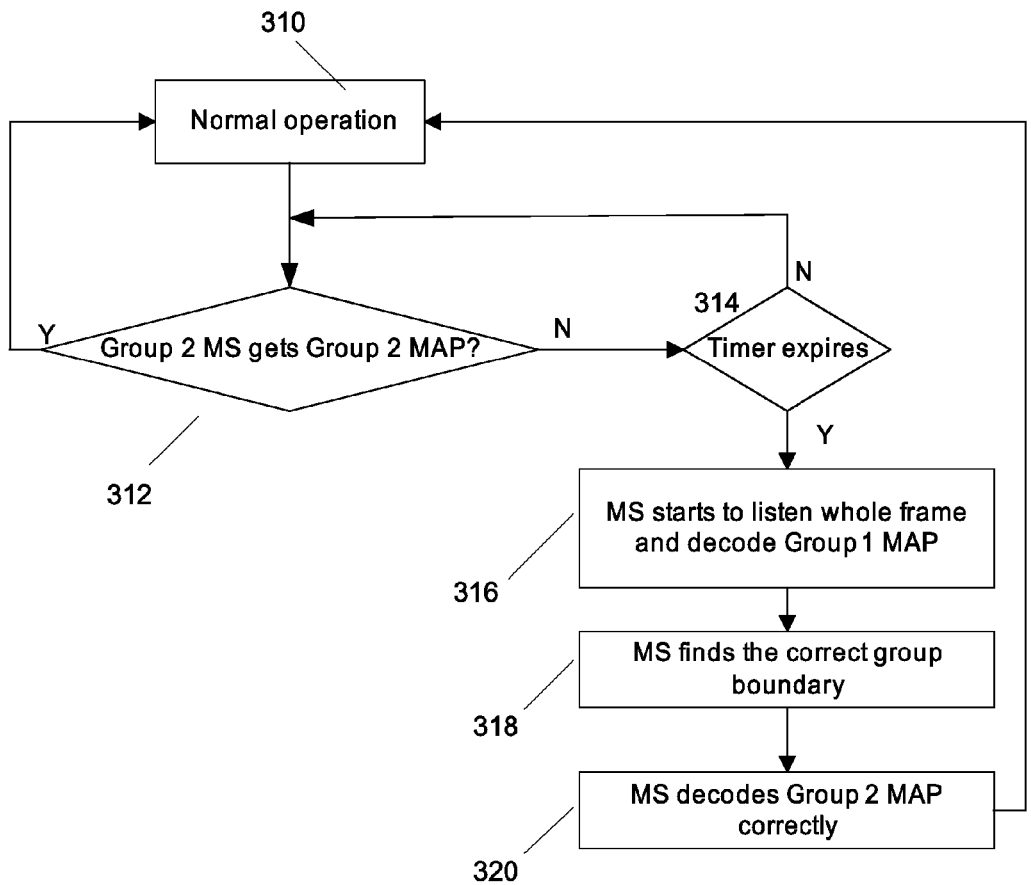
FIG. 3 is a flow chart illustrating operation of a mobile station in case of a DL control information synchronization loss according to an example embodiment.

FIG. 3 is a flow chart illustrating operation of a mobile station in case of a DL control information synchronization loss according to an example embodiment. During normal operation 310, the Group 2 MS may receive and decode (312) a Group 2 control information (e.g., 2 DL control information 223, which may include a DL Map, FCH or other DL control information). However, if the Group 2 MS is unable to obtain and decode a Group 2 DL control information 223 before a timer expires (since last successful reception or decoding of Group 2 DL control information or Group 2 DL Map), then the MS begins to receive or listen to the entire frame 200 (including the Group 1 portion 212), and decodes the Group 1 DL control information 219 (316), which may include, for example, receiving and decoding a DL Map, FCH and/or other control information for Group 1. The Group 2 MS may then obtain the correct (current) group boundary information 207 (identifying location of group boundary 205) from the Group 1 DL control information (318), either directly from DL control information 219 (e.g., from a DL Map, FCH or other control information within DL control information 219) or from a pointer or location information in DL control information 219. The Group 2 MS then receives and decodes (obtains) the Group 2 DL control information 223 (320).

Figure 4:
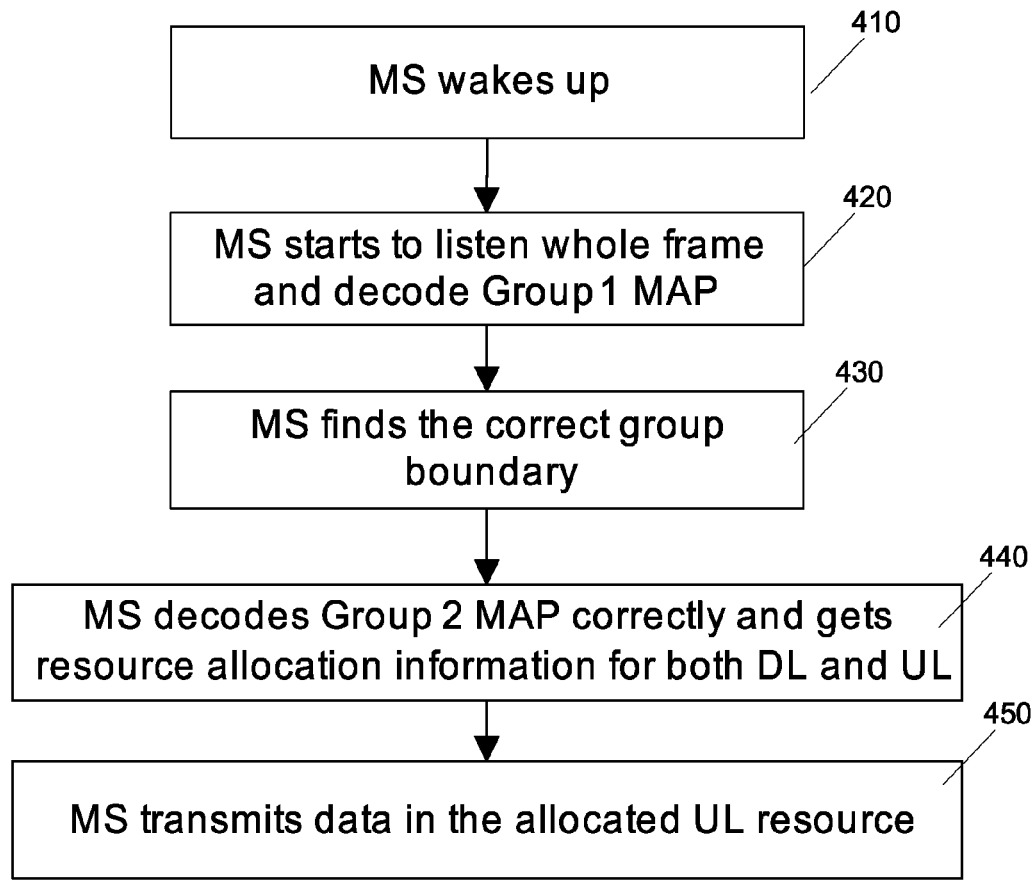
FIG. 4 is a flow chart illustrating operation of a mobile station that is transitioning from a sleep mode to active mode according to an example embodiment.

FIG. 4 is a flow chart illustrating operation of a mobile station that is transitioning from a sleep mode to active mode according to an example embodiment. At 410, after being in sleep mode, the Group 2 MS wakes up (or transitions to active mode or full power mode). At 420, the MS in Group 2 may start to receive and decode (or listen) to frame 200, and decodes Group 1 DL control information 219 (e.g., may receive and decode the FCH, DL Map and/or other control information within field 219) if it no longer has accurate information about the group boundary 205. (If the MS knows the correct group boundary 205, then it may receive and decode the Group 2 DL control information 223.) At 430, the MS may find the current or correct group boundary 205, e.g., based on the DL control information 219 for Group 1. At 440, Group 2 MS decodes Group 2 DL control information 223 (e.g., decodes a FCH, DL Map and/or other control information within field 223) and obtains resource allocation(s) for the Group 2 DL transmissions and UL transmissions. At 450, in a subsequent frame or future 200, the Group 2 MS transmits data to BS 104 via the UL resource (within Group 2 UL data 232) that was allocated to it in a previous frame 200.

In an example embodiment, when transitioning from sleep mode to active mode, a Group 2 MS may obtain and decode the Group 1 DL control information 219 in a first frame 200 and obtain the group boundary information 207 if it no longer has accurate information about the group boundary 205, or if it is unable to receive the Group 2 DL control information 223. Depending on processing time, the Group 2 MS may decode the DL control information 219 and obtain the boundary information 207 in a first frame, the Group 2 MS may then decode a Group 2 DL control information of a second (for example) frame 200 to obtain resources allocated for UL transmission, and then may transmit data UL to BS 104 in a third frame 200. This is merely example, and the process may be performed faster or slower, according to different example embodiments.

In an example embodiment, when transitioning from idle mode to active mode, the Group 2 MS may listen to Group 1 portion 212, and not Group 2 portion, to receive and decode a Group 1 DL control information 219 to obtain the group boundary information 207. Based on the group boundary information 207, the Group 2 MS may then receive and decode the Group 2 DL control information 223 to obtain any paging message(s) (or MOB_PAG-ADV) for the Group 2 mobile, which may be included within the Group 2 portion 214 of DL subframe 210. The paging messages may indicate that BS 104 has pending data for the Group 2 MS (data to be transmitted to the Group 2 MS). As noted, because the BS 104 may have adjusted or varied (or updated) the location of the group boundary 205 while the Group 2 MS was in idle mode, the Group 2 MS cannot rely on the last known (or previous) group boundary information for the MS. Thus, the MS may typically listen to both Group 1 DL MAP 219 (to obtain the updated location of the group boundary 205) and the Group 2 DL MAP (to obtain the paging messages for the Group 2 MS within the Group 2 portion 214).

In another embodiment where BS 104 chooses to provide a paging message for the Group 2 MS within the Group 1 portion 212, when transitioning from idle mode to active mode, the Group 2 MS may listen to Group 1 portion, to receive and decode a Group 1 DL Map 219 to directly obtain the location of any paging message(s) (or MOB_PAG-ADV) and the group boundary information 207 within the Group 1 portion 212. If there is any data pending as indicated in the paging message(s), the Group 2 MS may then receive and decode the Group 2 DL Map 223 based on the group boundary information 207 to resume a normal operation.

During a handover of the Group 2 MS from a current BS to a target BS, the handover-related messages from the target BS (e.g., a mobile base station handover response (MOB_B-SHO-RSP) or range response RNG-RSP message from the target BS) may include the Group assignment (to either Group 1 or Group 2) for the Group 2 MS, and the group boundary information 207 to allow the new MS to quickly determine the correct Group to which it belongs, and the location of the Group 2 DL control information if assigned to Group 2. During handover preparation or execution phase, group boundary information 207 and a group allocation information or group assignment of the target BSs should be included in the related messages, e.g., MOB_BSHO-REQ (mobile base station handover request), MOB_BSHO-RSP (BS handover response), RNG-REQ (ranging request)/RNG-RSP (ranging response). In this way, MS can jump to the correct group immediately after detaching from the old BS and hence handover interruption latency can be reduced.

Similarly, as part of handover, performing network entry (e.g., as part of idle mode to active mode transition), or other process, the Group 2 MS may perform ranging with a BS, including sending a RNG-REQ (ranging request message) and receiving from the BS a RNG-RSP (ranging response message). The BS may include in the RNG-RSP message, the Group assignment (to either Group 1 or Group 2) for the Group 2 MS, and the group boundary information 207 to allow the new MS to quickly determine the correct Group to which it belongs, and the location of the Group 2 DL control information if assigned to Group 2. In this manner, the Group 2 MS may jump to or quickly identify a location of the correct Group DL control information, which may reduce latency associated with handover or network entry.

Figure 5:
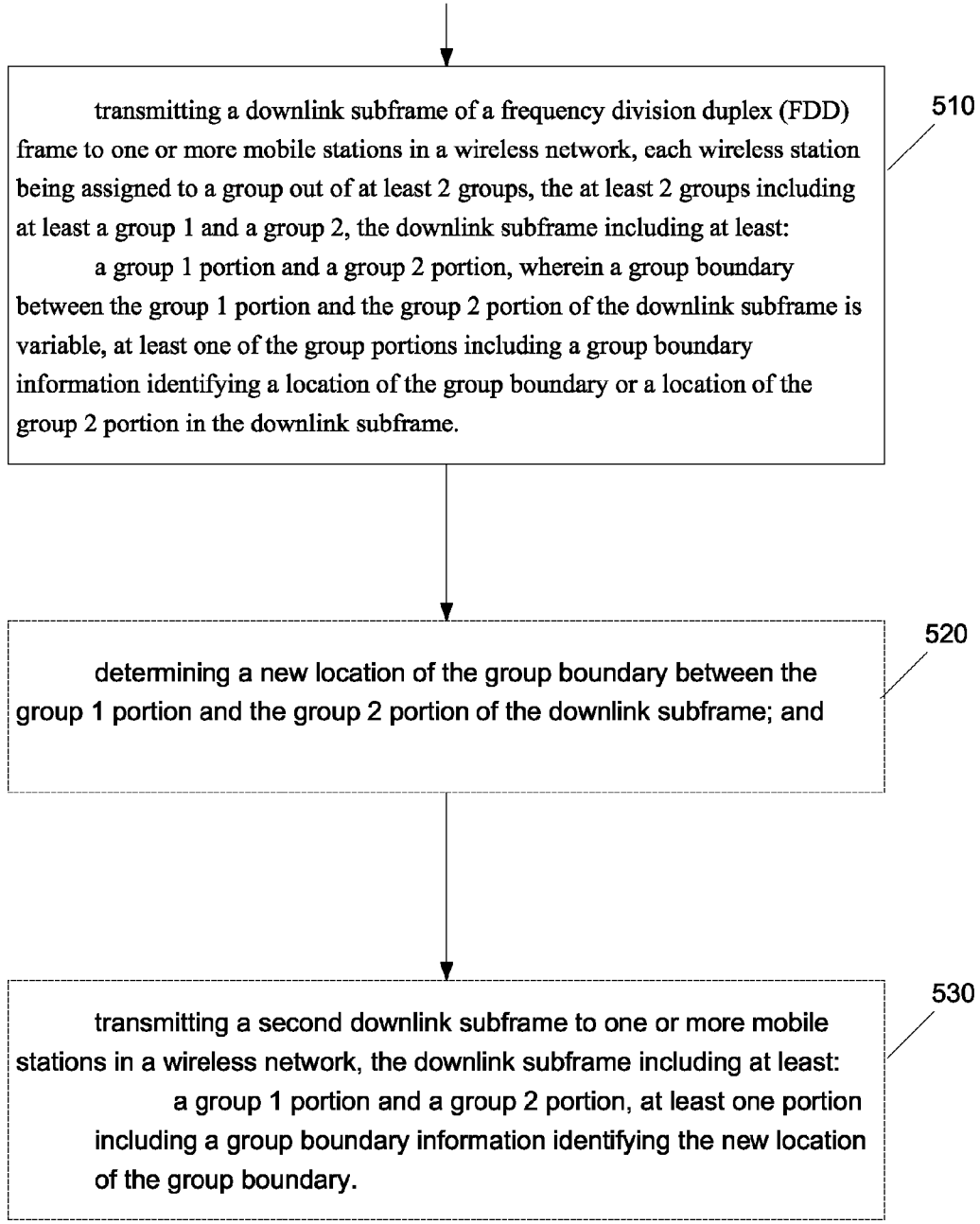
FIG. 5 is a flow chart illustrating operation of a wireless node according to an example embodiment.

FIG. 5 is a flow chart illustrating operation of a wireless node according to an example embodiment. The method shown in FIG. 5 may include transmitting (510) a downlink subframe of a frequency division duplex (FDD) frame to one or more mobile stations in a wireless network, each wireless station being assigned to a group out of at least 2 groups, the at least 2 groups including at least a group 1 and a group 2, the downlink subframe including at least: a group 1 portion and a group 2 portion, wherein a group boundary between the group 1 portion and the group 2 portion of the downlink subframe is variable, at least one of the group portions including a group boundary information identifying a location of the group boundary or a location of the group 2 portion in the downlink subframe.

In the flow chart of FIG. 5, the group 1 portion may include a downlink control information for group 1, and the group 2 portion may include a downlink control information for group 2, and the downlink control information for group 1 and the downlink control information for group 2 both may include the group boundary information.

In the flow chart of FIG. 5, the group 1 portion may include a downlink control information for group 1, and wherein the group 2 portion may include a downlink control information for group 2, further wherein the downlink control information for group 1 may identify a location of the group boundary information in the group 1 portion, and the downlink control information for group 2 identifies a location of the group boundary information in the group 2 portion.

In the flow chart of FIG. 5, the downlink control information for group 1 may include either the group boundary information or a symbol offset or location of the boundary information, wherein the boundary information is provided in the group 1 portion. In another example embodiment, the downlink control information for group 2 may include either the group boundary information or a symbol offset or location of the boundary information, wherein the boundary information may be provided in the group 2 portion.

In the flow chart of FIG. 5, the group 1 portion may include a group 1 downlink control information for group 1, an uplink control information for group 1, mobile station group assignments for one or more mobile stations of group 1, one or more mobile paging advertisement messages (or paging messages) for group 1, and the group boundary information, and wherein the group 2 portion includes a group 2 downlink control information for group 2, an uplink control information for group 2, mobile station group assignments for one or more mobile stations of group 2, one or more mobile paging advertisement messages (or paging messages) for group 2, and the group boundary information.

In the flow chart of FIG. 5, the group 1 portion may include a downlink control information for group 1 that identifies at least a symbol offset or location in the downlink subframe of the boundary information.

In the flow chart of FIG. 5, the downlink control information for group 1 may identify a coding rate and modulation scheme of the transmitted boundary information, and a symbol offset or location for the boundary information in the downlink subframe, and a coding rate, modulation scheme and symbol offset or location, and mobile station connection identifier (MS CID) for one or more downlink data transmissions to a mobile station of group 1.

The flow chart of FIG. 5 may further include determining (520) a new location of the group boundary between the group 1 portion and the group 2 portion of the downlink subframe; and transmitting (530) a second downlink subframe to one or more mobile stations in a wireless network, the downlink subframe including at least: a group 1 portion and a group 2 portion, at least one portion including a group boundary information identifying the new location of the group boundary.

According to an example embodiment, an apparatus may include a wireless interface (e.g., wireless transmitter and receiver or transceiver); and a controller, the controller configured to: transmit a downlink subframe of a frequency division duplex (FDD) frame to one or more mobile stations in a wireless network, each wireless station being assigned to a group out of at least 2 groups, the at least 2 groups including at least a group 1 and a group 2, the downlink subframe including at least: a group 1 portion and a group 2 portion, wherein a group boundary between the group 1 portion and the group 2 portion of the downlink subframe is variable (or flexible), at least one of the group portions including a group boundary information identifying a location of the group boundary or a location of the group 2 portion in the downlink subframe.

Figure 6:
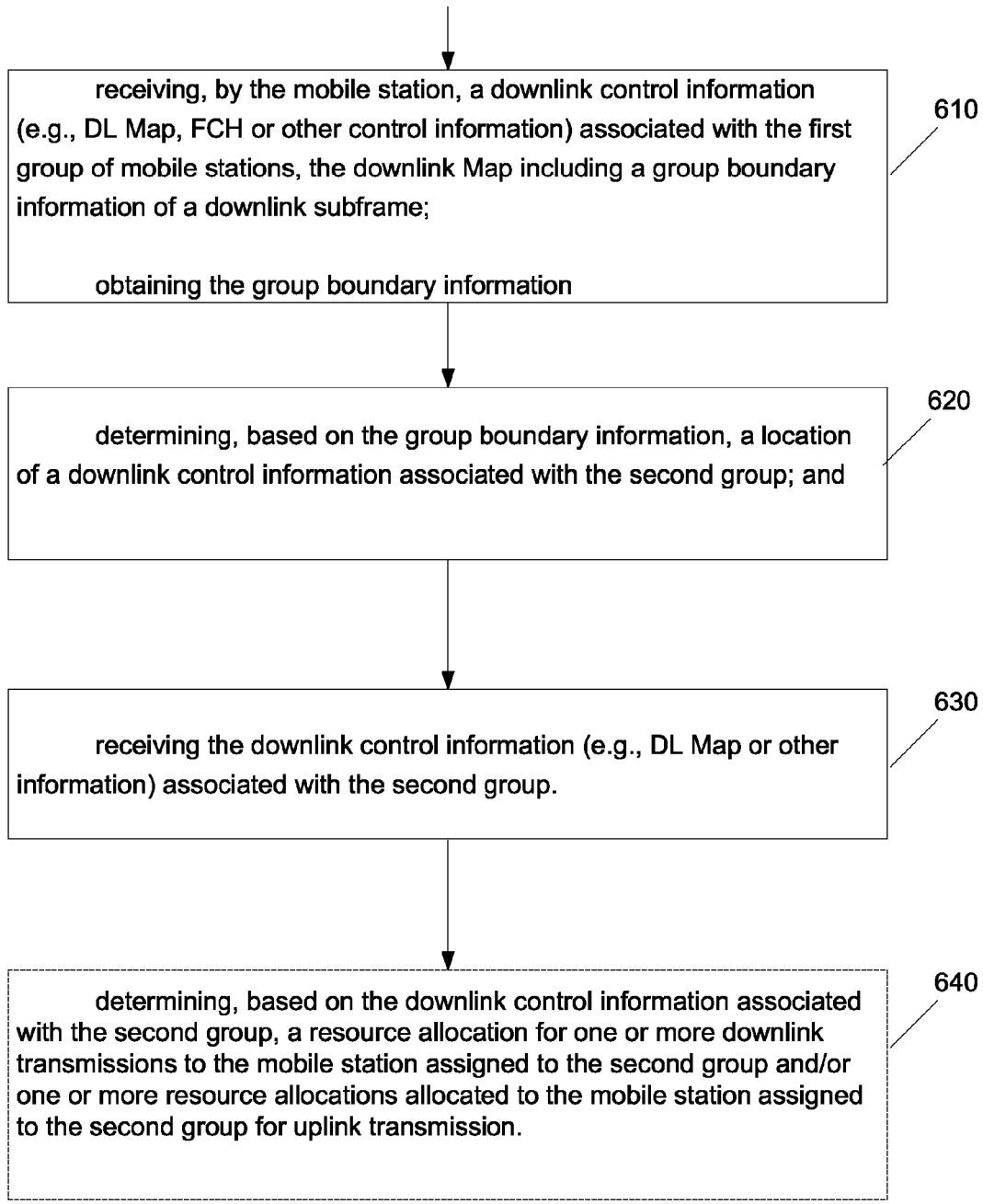
FIG. 6 is a flow chart illustrating operation of a wireless node (such as a mobile station) according to an example embodiment.

FIG. 6 is a flow chart illustrating operation of a wireless node (such as a mobile station) according to an example embodiment. The method shown in FIG. 6 may be an example method for receiving information by a mobile station in a wireless network, the mobile station being assigned to a second group out of a plurality of groups including at least a first group and a second group of mobile stations in the wireless network. The method of FIG. 6 may include receiving (610), by the mobile station, a downlink control information associated with the first group of mobile stations and obtaining the group boundary information, the downlink control information including a group boundary information of a downlink subframe. Alternatively, the downlink control information may include a location of, or pointer to, the group boundary information (rather than actually including the group boundary information).

In an example embodiment, the method of FIG. 6 may further include determining (620), based on the group boundary information, a location of a downlink control information associated with the second group, receiving (630) the downlink control information associated with the second group, and determining (640), based on the downlink control information associated with the second group, a resource allocation for one or more downlink transmissions to the mobile station assigned to the second group and/or one or more resource allocations allocated to the mobile station assigned to the second group for uplink transmission.

In the alternative embodiment where the downlink map includes a location of or pointer to the group boundary information 207, operation 620 may include obtaining the group boundary information (e.g., based on the location or pointer in the downlink map), and then determining, based on the group boundary information, a location of a downlink control information associated with the second group.

In the flow chart illustrated in FIG. 6, the operation 610 may include receiving, by the mobile station assigned to the second group, a downlink control information associated with the first group of mobile stations, the downlink control information including a group boundary information of a downlink subframe that identifies or points to a location of a group boundary between a first group portion and a second group portion of the downlink subframe.

In the flow chart illustrated in FIG. 6, the downlink control information associated with the second group may identify a resource allocation for an uplink control information associated with the second group. The method illustrated in FIG. 6 may further include receiving, based on the downlink control information associated with the second group, the uplink control information associated with the second group identifying a resource allocation allocated to one or more mobile stations of the second group, and performing, by the mobile station based on the uplink control information for the second group, an uplink data transmission using resources allocated to the mobile station.

According to another example embodiment, an apparatus may be provided at a mobile station in a wireless network, the mobile station being assigned to a second group out of a first group and a second group of mobile stations in the wireless network. The apparatus may include a wireless interface (or wireless transmitter and receiver), and a controller. The controller may be configured to: receive, by the mobile station, a downlink control information associated with the first group of mobile stations, the downlink control information including a group boundary information of a downlink subframe, determine, based on the group boundary information, a location of a downlink control information associated with the second group, and receive the downlink control information associated with the second group.

Figure 7:
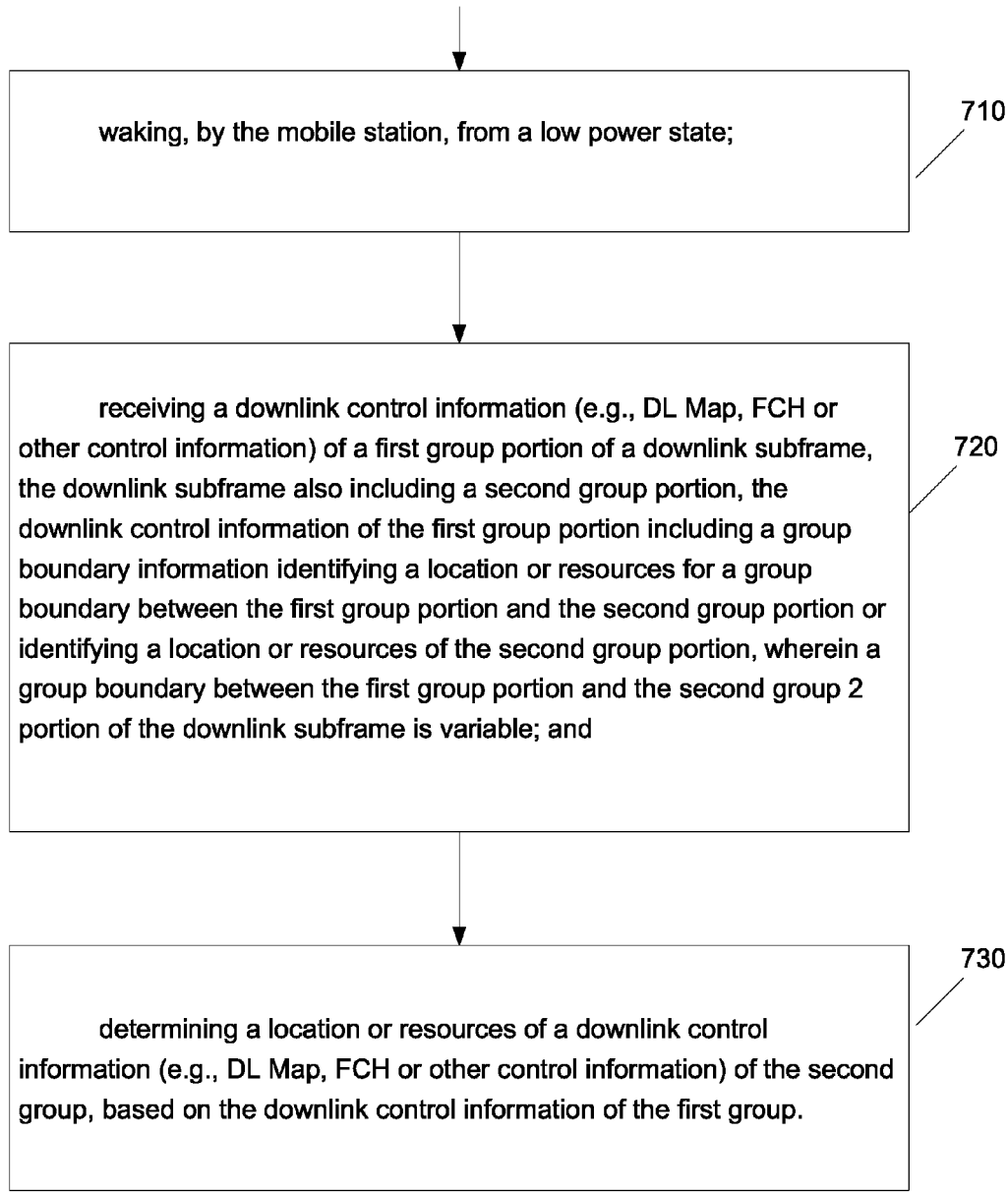
FIG. 7 is a flow chart illustrating operation of a wireless node or mobile station according to an example embodiment.

FIG. 7 is a flow chart illustrating operation of a wireless node or mobile station according to an example embodiment. The flow chart of FIG. 7 may be directed to a method of synchronizing a mobile station in a wireless network, the mobile station being assigned to a second group out of a first group and a second group of mobile stations in the wireless network. Referring to FIG. 7, the method may include waking (710), by the mobile station, from a low power state, receiving (720) a downlink control information of a first group portion of a downlink subframe, the downlink subframe also including a second group portion, the downlink control information of the first group portion including a group boundary information identifying a location or resources for a group boundary between the first group portion and the second group portion or identifying a location or resources of the second group portion, wherein a group boundary between the first group portion and the second group 2 portion of the downlink subframe is variable, and determining a location or resources of a downlink control information of the second group, based on the downlink control information of the first group.

In the method illustrated in FIG. 7, operation 710 may include waking from a sleep state. The method illustrated in FIG. 7 may further include determining, based on the downlink control information of the second group, resources allocated for downlink data transmission to the mobile station and/or resources allocated for uplink data transmission from the mobile station.

In the method illustrated in FIG. 7, the waking (710) may include waking from an idle state. And, the method illustrated in FIG. 7 may further include determining, based on the downlink control information of the second group, a location or resources in the second group portion for a mobile paging message indicating that a base station has pending data to be transmitted for the mobile station, receiving, in the second group portion, the mobile paging message for the mobile station, and responding to the mobile paging message to obtain the pending data, and determining, based on the downlink control information of the second group, resources allocated for downlink data transmission to the mobile station and/or resources allocated for uplink data transmission from the mobile station.

In another example embodiment, an apparatus may be provided in a mobile station in a wireless network. The mobile station may be assigned to a second group out of a first group and a second group of mobile stations in the wireless network. The apparatus may include a wireless interface (e.g., wireless transmitter and receiver), and a controller, the controller configured to: wake from a low power state; receive a downlink control information of a first group portion of a downlink subframe, the downlink subframe also including a second group portion, the downlink control information of the first group portion including a group boundary information identifying a location or resources for a group boundary between the first group portion and the second group portion or identifying a location or resources of the second group portion, wherein a group boundary between the first group portion and the second group portion of the downlink subframe is variable; and determine a location or resources of a downlink control information of the second group, based on the downlink control information of the first group.

Figure 8:
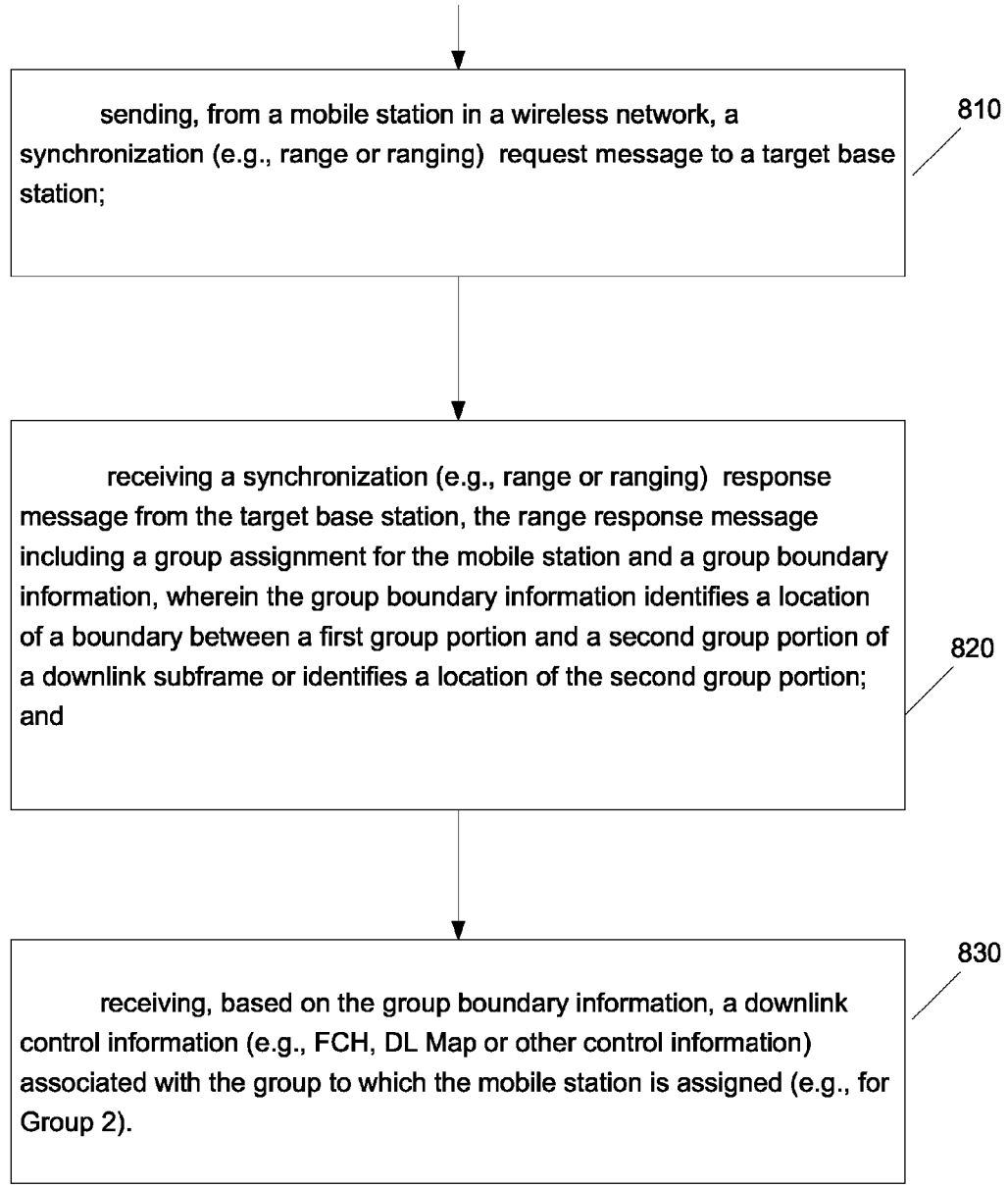
FIG. 8 is a flow chart illustrating operation of a wireless node or mobile station according to another example embodiment.

FIG. 8 is a flow chart illustrating operation of a wireless node or mobile station according to another example embodiment. The method may include sending (810), from a mobile station in a wireless network, a synchronization request message to a target base station, receiving (820) a synchronization response message from the target base station, the synchronization response message including a group assignment for the mobile station and a group boundary information, wherein the group boundary information identifies a location of a boundary between a first group portion and a second group portion of a downlink subframe or identifies a location of the second group portion, and receiving (830), based on the group boundary information, a downlink control information associated with the group to which the mobile station is assigned.

The method illustrated in FIG. 8 may further include determining, based on the received downlink control information, resources allocated for downlink data transmission to the mobile station and/or resources allocated for uplink data transmission from the mobile station.

In an example embodiment, the sending (810) may include sending, from a mobile station in a wireless network, a range request message, and the receiving (820) may include receiving a range response message.

Figure 9:
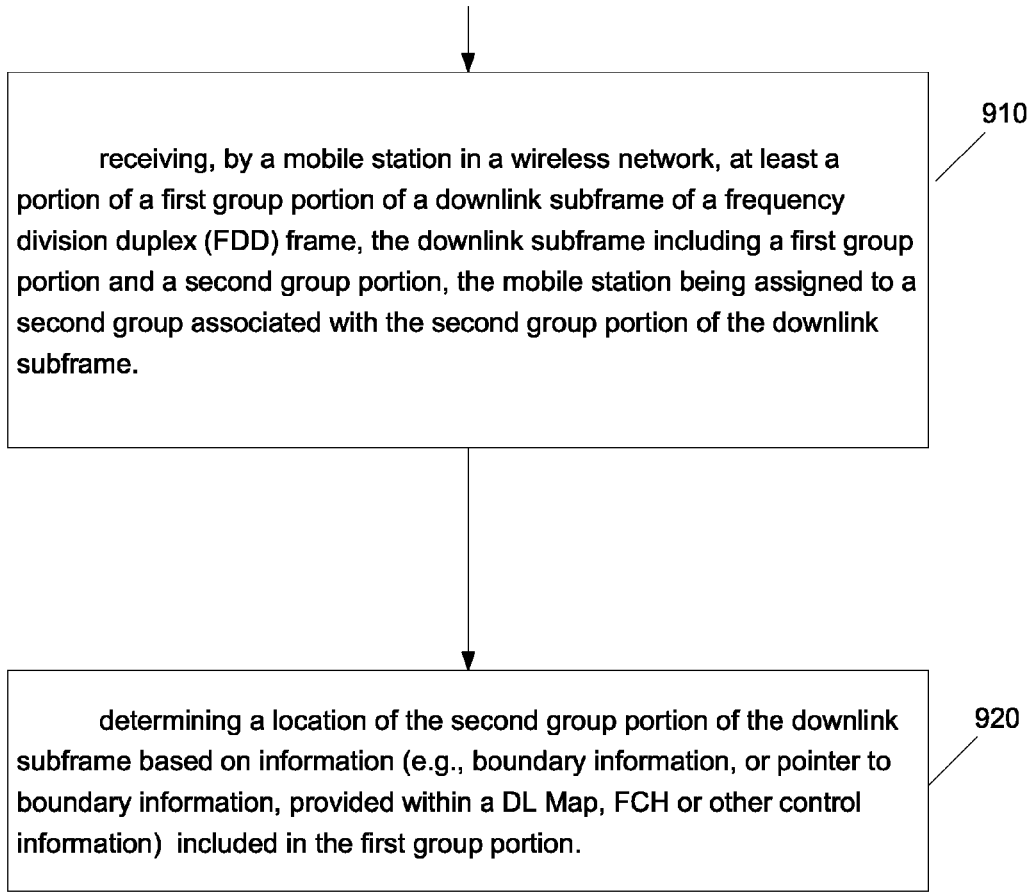
FIG. 9 is a flow chart illustrating operation of a wireless node or mobile station according to another example embodiment.

FIG. 9 is a flow chart illustrating operation of a wireless node or mobile station according to another example embodiment. Operation 910 may include receiving, by a mobile station in a wireless network, at least a portion of a first group portion of a downlink subframe of a frequency division duplex (FDD) frame, the downlink subframe including a first group portion and a second group portion, the mobile station being assigned to a second group associated with the second group portion of the downlink subframe. Operation 920 may include determining a location of the second group portion of the downlink subframe based on information included in the first group portion.

In an example embodiment, operation 920 may include obtaining a group boundary information in the first group portion of the downlink subframe, and determining a location of the second group portion of the downlink subframe based on the group boundary information.

In an example embodiment, the flow chart of FIG. 9 may further include receiving a downlink control information for the second group based on the location of the second group portion of the downlink subframe, and determining, based on the downlink control information for the second group, resources allocated for one or more downlink data transmissions to the mobile station or resources allocated to the mobile station for uplink transmission.

In another example embodiment, the group boundary information may be included only in a Group 1 portion 212 for a frame, only in a Group 2 portion 214, in both Group 1 and Group 2 portions of a frame 200, may be provided in Group 1 and Group 2 alternately (e.g., alternating providing group boundary information, in Group 1 portion for frame 1, in Group 2 portion for frame 2, in Group 1 portion for frame 3, etc.), or other arrangement. Also, in an alternative embodiment, the DL control information and other control information may be transmitted in a separate control channel (e.g., separate carrier or channel for control information and another carrier or channel for data).

Figure 10:
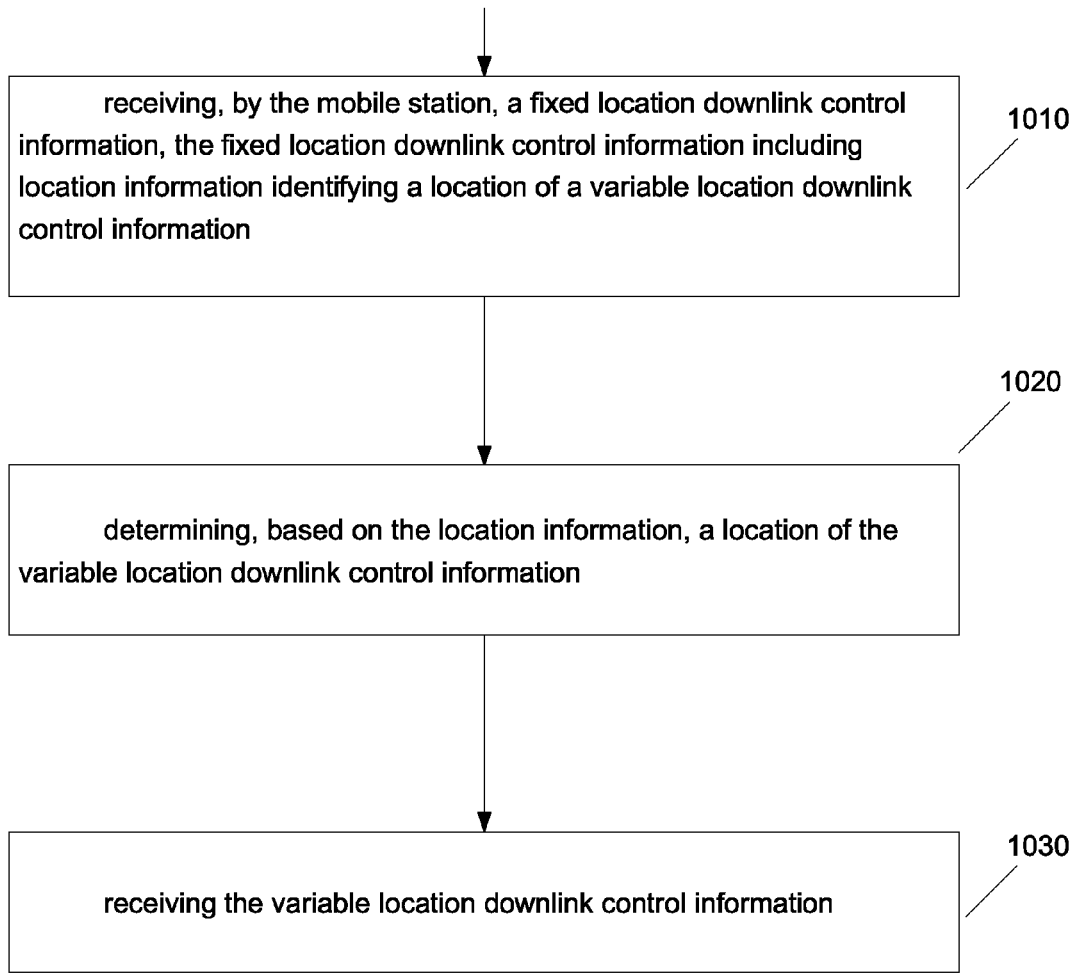
FIG. 10 is a flow chart illustrating operation of a wireless node according to an example embodiment.

FIG. 10 is a flow chart illustrating operation of a wireless node according to an example embodiment. In FIG. 10, a method of receiving information by a mobile station in a wireless network is disclosed. The method may include receiving (1010), by the mobile station, a fixed location downlink control information (e.g., DL control information 219 for Group 1, which may occur after preamble 216, for example), the fixed location downlink control information including location information (e.g., group boundary information 207) identifying a location of a variable location downlink control information. The method of FIG. 10 may also include determining (1020), based on the location information (e.g., the group boundary 205), a location of the variable location downlink control information (e.g., DL control information 223), and receiving (1030) the variable location downlink control information.

In the flow chart of FIG. 10, according to another example embodiment, the fixed location downlink control information may include a first downlink Map (e.g., DL Map within DL control information 219) provided at a fixed location within a frame, wherein the variable location downlink control information may include a second downlink Map (e.g., DL Map within DL control information 223 for Group 2) provided at a location that is variable or selectable by a base station or other infrastructure node, and wherein the location information may include a boundary location information (e.g., group boundary information 207) that identifies a location of the second downlink Map.

In another example embodiment, the flow chart of FIG. 10 may further include determining, based on the variable location downlink control information, a resource allocation for one or more downlink transmissions to the mobile station and/or one or more resource allocations allocated to the mobile station for uplink transmission.

In another example embodiment, the flow chart of FIG. 10 may further include determining, based on the variable location downlink control information, a resource allocation for one or more downlink transmissions to the mobile station, and receiving the one or more of the downlink transmissions. Also, in an example embodiment, the mobile station may be assigned to a group (e.g., Group 2 or other group) associated with the variable location downlink control information.

Figure 11:
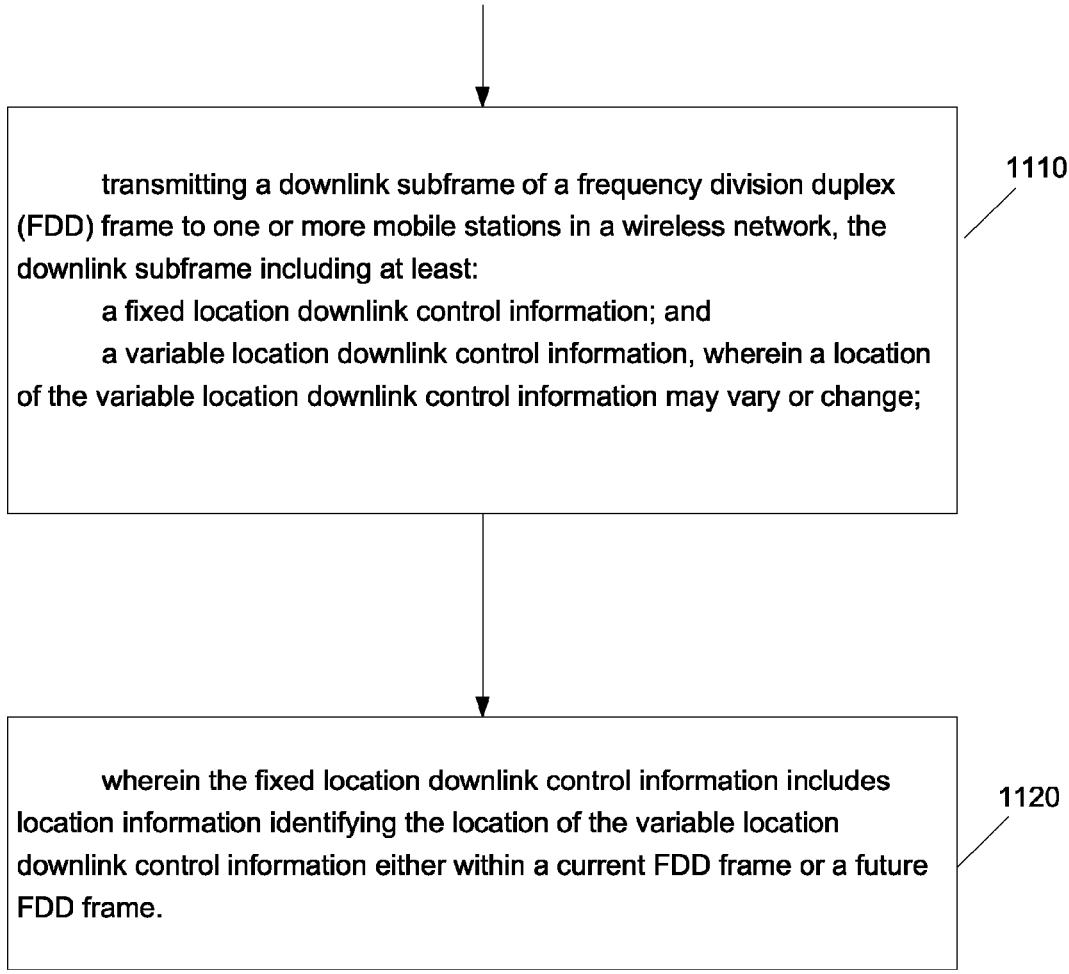
FIG. 11 is a flow chart illustrating operation of a wireless node according to an example embodiment.

FIG. 11 is a flow chart illustrating operation of a wireless node according to another example embodiment. The method may include transmitting (1110) a downlink subframe (e.g., DL subframe 210) of a frequency division duplex (FDD) frame (e.g., frame 210) to one or more mobile stations in a wireless network, the downlink subframe including at least: a fixed location downlink control information (e.g., DL control information 219 for Group 1), and a variable location downlink control information (e.g., DL control information 223 for Group 2), wherein a location of the variable location downlink control information may vary or change. Also, (1120) in an example embodiment, the fixed location downlink control information may include location information (e.g., group boundary information 207 or pointer to or location thereof) identifying the location of the variable location downlink control information either within a current FDD frame or a future FDD frame.

Figure 12:
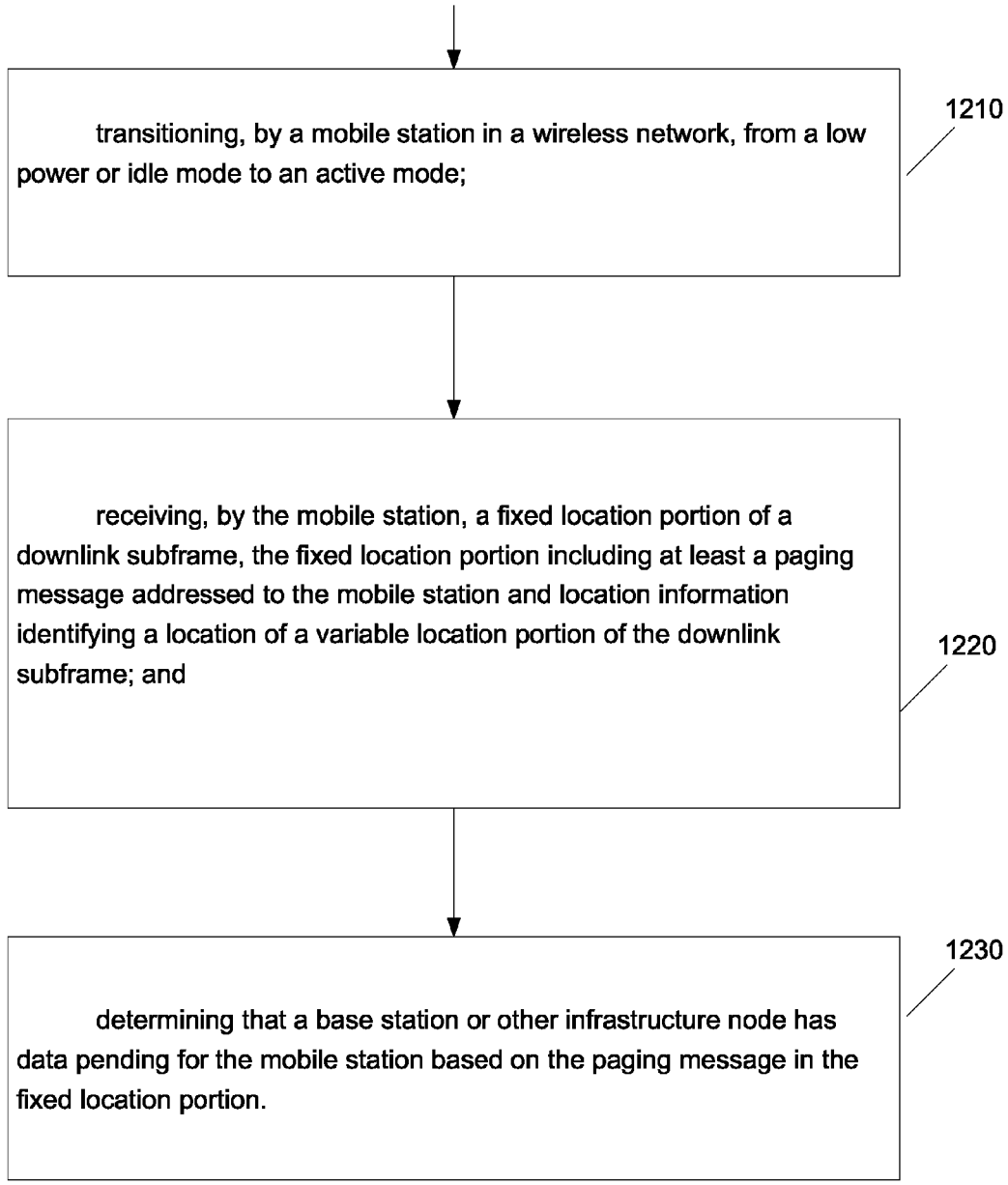
FIG. 12 is a flow chart illustrating operation of a wireless node according to an example embodiment.

FIG. 12 is a flow chart illustrating operation of a wireless node according to another example embodiment. The method illustrated in FIG. 12 may include transitioning (1210), by a mobile station in a wireless network, from a low power or idle mode to an active mode, receiving (1220), by the mobile station, a fixed location portion (e.g., Group 1 portion 212) of a downlink subframe (e.g., DL subframe 210), the fixed location portion including at least a paging message addressed to the mobile station and location information identifying a location of a variable location portion of the downlink subframe, and determining (1230) that a base station (e.g., BS 104) or other infrastructure node has data pending for the mobile station based on the paging message in the fixed location portion.

The method of FIG. 12 may further include receiving the variable location portion of the downlink subframe including a downlink Map.

Figure 13:
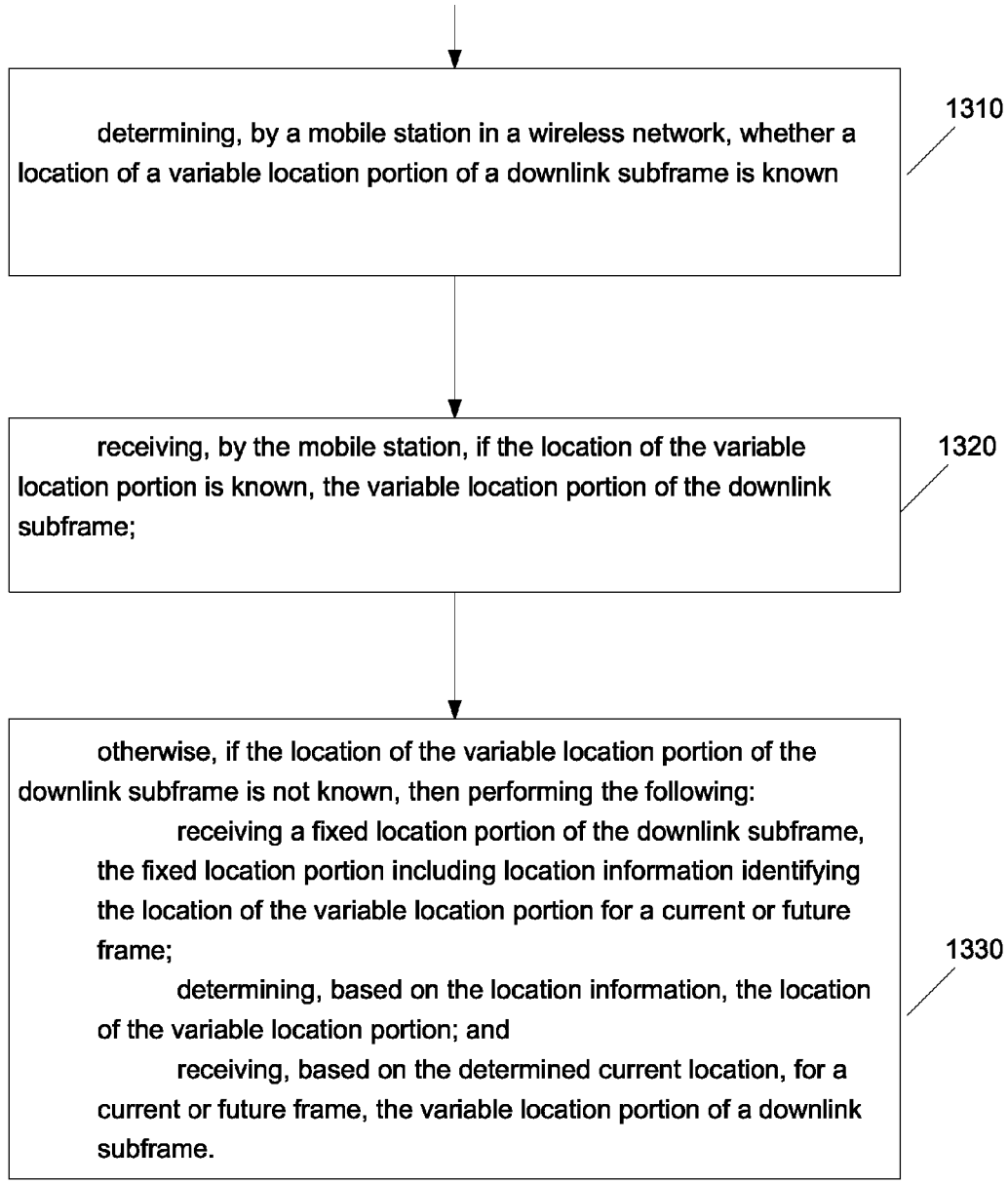
FIG. 13 is a flow chart illustrating operation of a wireless node according to an example embodiment.

FIG. 13 is a flow chart illustrating operation of a wireless node according to an example embodiment. The method of FIG. 13 may include, for example, determining (1310), by a mobile station in a wireless network, whether a location of a variable location portion of a downlink subframe is known, receiving (1320), by the mobile station, if the location of the variable location portion is known, the variable location portion of the downlink subframe, otherwise (1330), if the location of the variable location portion of the downlink subframe is not known, then performing the following: receiving a fixed location portion of the downlink subframe, the fixed location portion including location information identifying the location of the variable location portion for a current or future frame; determining, based on the location information, the location of the variable location portion; and receiving, based on the determined current location, for a current or future frame, the variable location portion of a downlink subframe.

According to another example embodiment, a BS (e.g., BS 104) may transmit two different types of frames. The first type of frame may include a fixed boundary frame in which the DL control information 219 (and the Group 1 portion) are provided at a fixed or known location within the frame, e.g., after preamble 216, and the DL control information 223 (and Group 2 portion 214) are provided at a default location (e.g., which may be fixed or configurable by BS 104) within the frame 200. The fixed boundary frame may provide fixed or default boundaries between two or more Group portions. This default location for Group 2 DL control information 223 may be used by a MS that has lost a group boundary 205 (or lost the location if its Group DL control information) or is returning from Idle or low power state, and needs to obtain the location of its DL control information within the variable boundary frame (described below).

The second type of frame that may be transmitted by a BS 104, for example, may include a variable boundary frame, in which the Group 1 portion 212 and DL control information 219 are still at a fixed location, but the Group 2 portion 214 and DL control information 223 for Group 2 are provided at a variable location, e.g., variable or selectable by BS 104. The location of Group 2 DL control information, for example, may be adjusted by adjusting the group boundary 205.

In an example embodiment, a BS may typically transmit the variable boundary frame (e.g., to allow the BS to select a location of the group boundary 205). However, at certain intervals, e.g., periodically, randomly, every other frame, every third or $7^{th}$ frame, or other time, the BS may transmit a fixed boundary frame, which may provide the Group 2 portion 214 and the DL control information 223 at a default location (typically known by the MS, e.g., even after losing synchronization, or returning from idle or low power mode). For example, at least the Group 2 portion or the DL control information 223 may typically include the (current) Group boundary information 207, so that a MS may receive the DL control information at the default location (in the fixed boundary frame), and then use this information to receive and decode DL control information 223 for a subsequent variable boundary frame.

Thus, in an example embodiment, a MS that has lost boundary location information (or location of its group DL control information), may either 1) obtain the group boundary information from Group 1 control information (in the variable boundary frame, or possibly the fixed boundary frame), since the Group 1 portion 212 and/or DL control information 219 may include the boundary information 207. Or, 2) the MS may wait for the next fixed boundary frame, and receive the DL control information (e.g., DL Map for information 223) at the default location in that next fixed boundary frame, since such DL control information may typically include (for example), the group boundary information 207 (for the variable boundary frame) at a known or default location in the fixed boundary frame.

Figure 14:
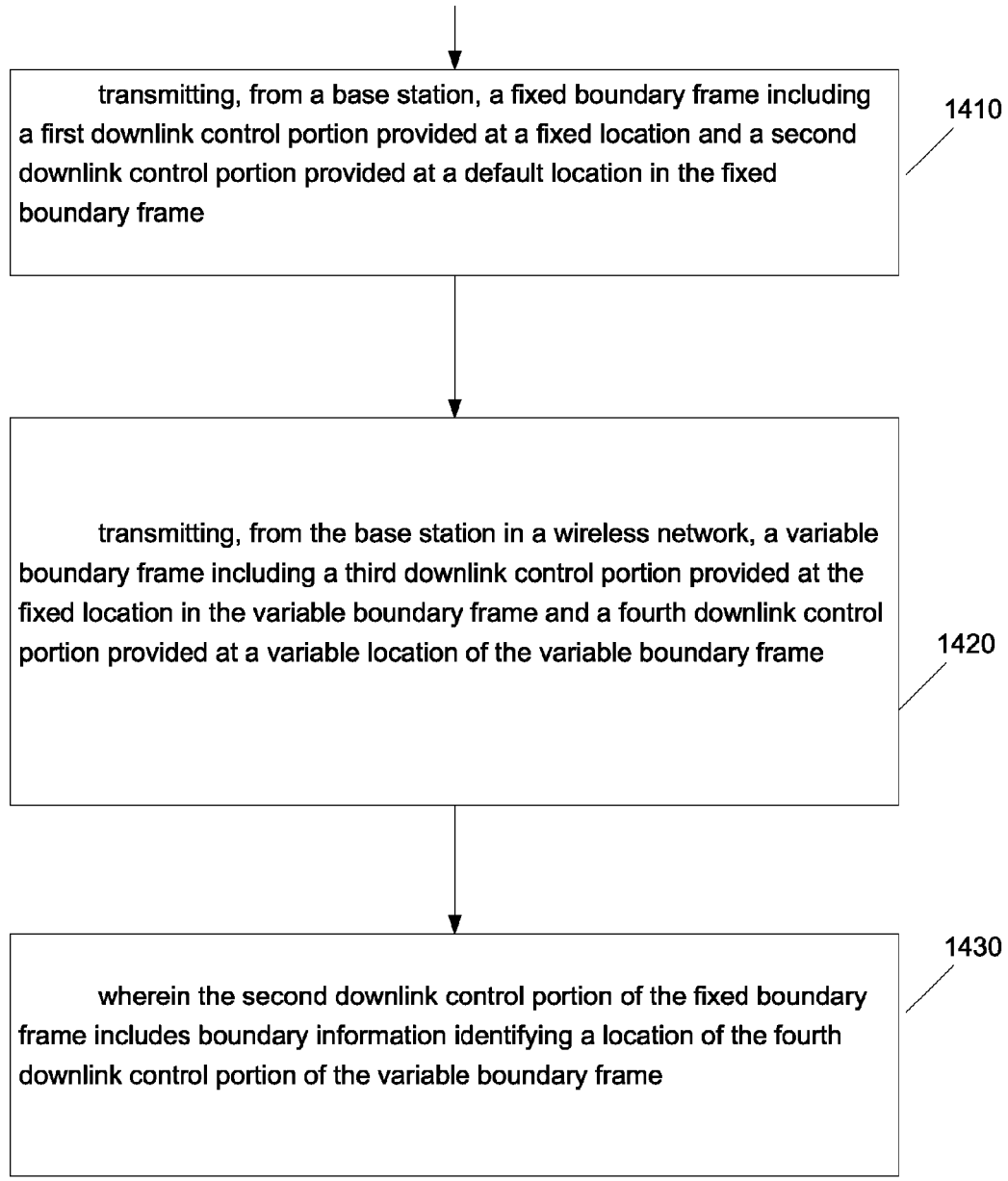
FIG. 14 is a flow chart illustrating operation of a wireless node according to an example embodiment.

FIG. 14 is a flow chart illustrating operation of a wireless node according to an example embodiment. The method of FIG. 14 may include transmitting (1410), from a base station, a fixed boundary frame including a first downlink control portion provided at a fixed location and a second downlink control portion provided at a default location in the fixed boundary frame, and transmitting (1420), from the base station in a wireless network, a variable boundary frame including a third downlink control portion provided at the fixed location in the variable boundary frame and a fourth downlink control portion provided at a variable location of the variable boundary frame. In an example embodiment, (1430), the second downlink control portion of the fixed boundary frame may include boundary information identifying a location of the fourth downlink control portion of the variable boundary frame.

With respect to the method of FIG. 14, the first and third downlink control portions may each include a frame control header, a downlink Map and/or other control information associated with a first group of mobile stations. Also, the second and fourth downlink control portions may each include a frame control header, a downlink Map and/or other control information associated with a second group of mobile stations. The method of FIG. 14 may further include receiving, by a mobile station, the fixed boundary frame, determining a location of the fourth downlink control portion in the variable boundary frame based on the boundary information in the fixed boundary frame, and receiving the fourth downlink control portion of the variable boundary frame.

Figure 15:
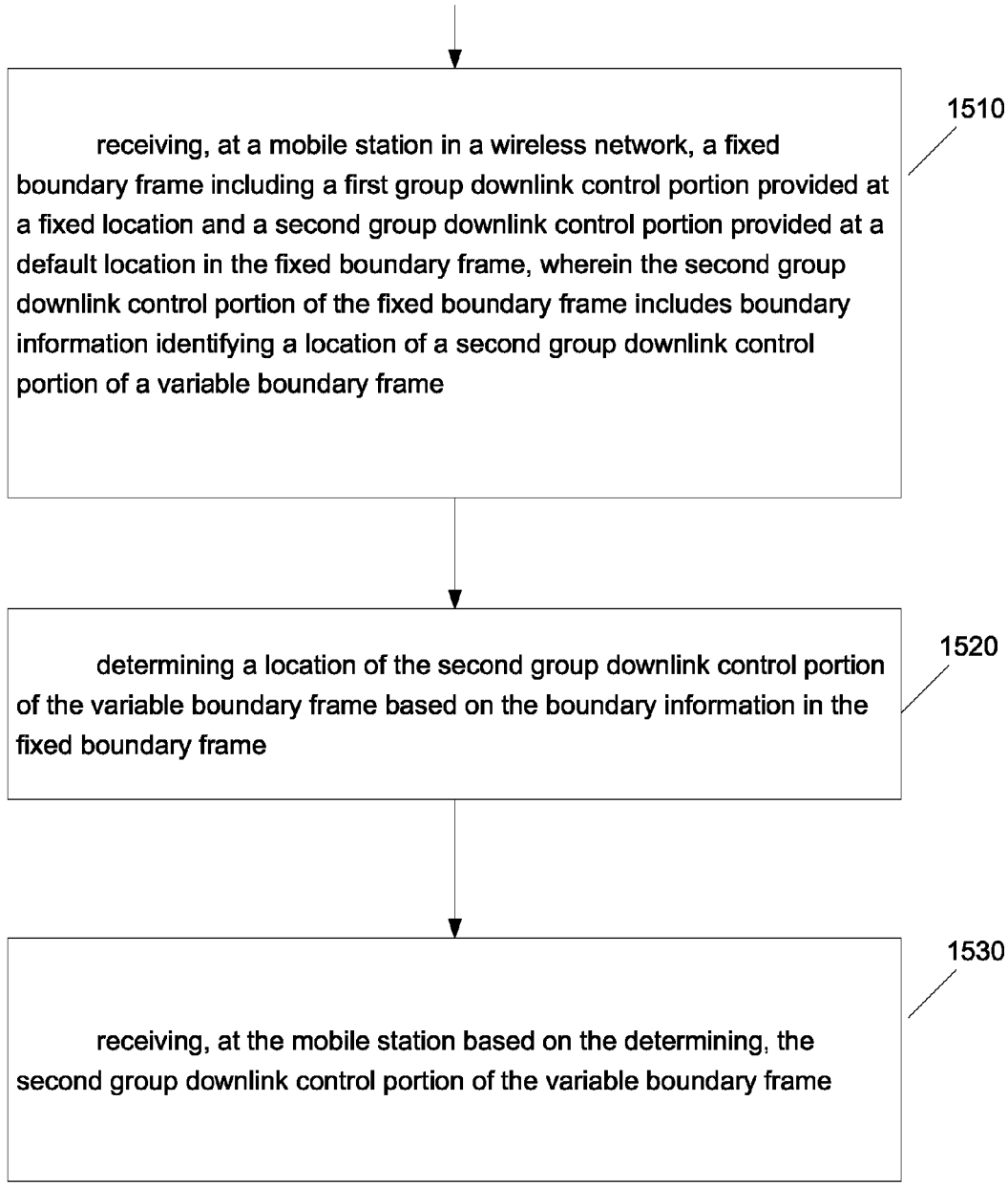
FIG. 15 is a flow chart illustrating operation of a wireless node according to yet another example embodiment.

FIG. 15 is a flow chart illustrating operation of a wireless node according to another example. The method may include, for example, receiving (1510), at a mobile station in a wireless network, a fixed boundary frame including a first group downlink control portion provided at a fixed location and a second group downlink control portion provided at a default location in the fixed boundary frame, wherein the second group downlink control portion of the fixed boundary frame includes boundary information identifying a location of a second group downlink control portion of a variable boundary frame, determining (1520) a location of the second group downlink control portion of the variable boundary frame based on the boundary information in the fixed boundary frame, and receiving (1530), at the mobile station based on the determining, the second group downlink control portion of the variable boundary frame.

Figure 16:
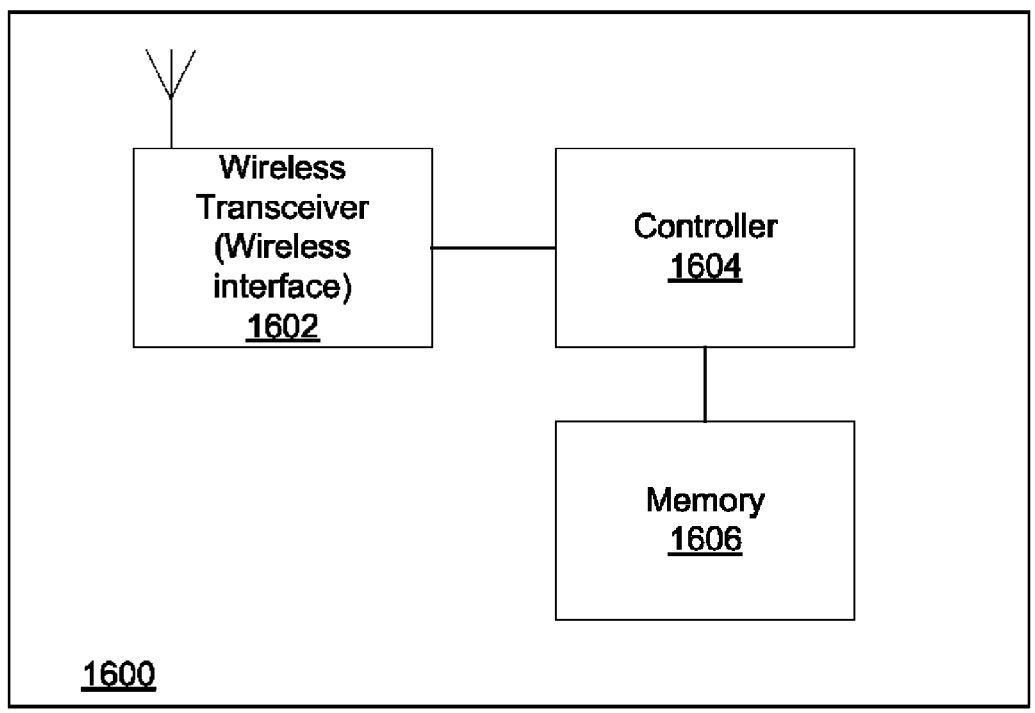
FIG. 16 is a block diagram of a wireless node according to an example embodiment.

FIG. 16 is a block diagram of a wireless node according to an example embodiment. The wireless node 1600 may include a wireless interface or wireless transceiver 1602 (including transmitter and receiver), and a controller 1604, and a memory 1606. For example, some operations illustrated in other FIGs. and/or described herein may be performed by a controller 1604, under control of software or firmware, for example.

In addition, a storage medium may be provided that includes stored instructions, which when executed by a controller or processor may result in the controller 1604, or other controller or processor, performing one or more of the functions or tasks described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program (s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method of synchronizing a mobile station in a wireless network, the mobile station being assigned to a second group out of a plurality of groups including at least a first group and a second group of mobile stations in the wireless network, the method comprising:

waking, by the mobile station, from a low power state;

determining that synchronization with a second group portion of a downlink subframe has been lost; and performing the following in response to determining that synchronization with the second group portion has been lost:

receiving a downlink control information of a first group portion of the downlink subframe, the downlink control information of the first group portion including a group boundary information identifying a location of a group boundary between the first group portion and the second group portion or identifying a location or resources of the second group portion, wherein a group boundary between the first group portion and the second group portion of the downlink subframe is variable;

determining an updated location of a downlink control information of the second group portion, based on the downlink control information of the first group portion; and receiving the downlink control information of the second group portion based on the updated location of the downlink control information of the second group portion that was determined from the downlink control information of the first group portion.

2. The method of claim 1 wherein the waking comprises waking from a idle state, the performing the following further comprising:

determining, based on the downlink control information of the second group portion, a location or resources in the second group portion for a mobile paging message indicating that a base station has pending data to be transmitted for the mobile station;

receiving, in the second group portion, the mobile paging message for the mobile station; and responding to the mobile paging message to obtain the pending data.

3. The method of claim 1 and further comprising:
performing the following when synchronization with the second group portion is determined not to be lost:
receiving a downlink control information of the second group portion without receiving the downlink control information of a first group portion.

4. An apparatus provided in a mobile station in a wireless network, the mobile station being assigned to a second group out of a plurality of groups including a first group and a second group of mobile stations in the wireless network, the apparatus comprising:

a wireless interface; and a controller, the apparatus configured to:
determine that more than a predetermined amount of time has elapsed since a last decoding of a downlink control information of a second group portion of a downlink subframe; and the apparatus further configured to perform the following if more than a predetermined amount of time has elapsed since a last decoding of a downlink control information of a second group portion of a downlink subframe:

decode a downlink control information of a first group portion of the downlink subframe, the downlink control information of the first group portion including information identifying a location of the second group portion;

determine an updated location of a downlink control information of the second group portion, based on the downlink control information of the first group portion; and decode the downlink control information of the second group portion based on the updated location of the downlink control information of the second group portion that was determined from the downlink control information of the first group portion.

5. A method comprising:
determining, by a mobile station assigned to a variable location portion of a downlink subframe in a wireless network, whether a location of the variable location portion is known;

receiving, by the mobile station, if the location of the variable location portion is known, the variable location portion of the downlink subframe;

otherwise, if the location of the variable location portion of the downlink subframe is not known, then performing the following:

receiving a fixed location portion of the downlink subframe, the fixed location portion including location information identifying the location of the variable location portion for a current or future frame;

determining, based on the location information, the location of the variable location portion; and receiving, based on the determined location of the variable location portion, for a current or future frame, the variable location portion of a downlink subframe.

6. The method of claim 5 wherein the downlink subframe includes a first group portion and a second group portion, the mobile station is assigned to the second group portion, the variable location portion of the downlink subframe comprises the second group portion of the downlink subframe, and the fixed location portion of the downlink subframe comprises the first group portion; and wherein the receiving, by the mobile station, if the location of the variable location portion is known, the variable location portion of the downlink subframe comprises receiving the second group portion of the downlink subframe if the location of the second group portion is known.

7. The method of claim 6 wherein if the location of the second portion of the downlink subframe is not known, then performing the following:

receiving the first group portion of the downlink subframe, the first group portion including location information identifying the location of the second group portion for a current or future frame;

determining, based on the location information, the location of the second group portion; and receiving, based on the determined location of the second group portion, for a current or future frame, the second group portion of a downlink subframe.

8. A method of synchronizing a mobile station in a wireless network, the mobile station being assigned to a second group out of a plurality of groups including at least a first group and a second group of mobile stations in the wireless network, the first group of mobile stations being assigned a first group portion of a downlink subframe and the second group of mobile stations being assigned a second group portion of the downlink subframe, the method comprising:

determining whether synchronization with a second group portion of a downlink subframe has been lost; and performing the following when synchronization with the second group portion has not been lost:
receiving a downlink control information of only a second group portion of the downlink subframe;

performing the following when synchronization with the second group portion is determined to be lost:
receiving a downlink control information of the first group portion of the downlink subframe, the downlink control information of the first group portion identifying a location of the second group portion; and determining a location of a downlink control information of the second group portion based on the downlink control information of the first group portion.

9. A method of synchronizing a mobile station in a wireless network, the mobile station being assigned to a second group out of a plurality of groups including at least a first group and a second group of mobile stations in the wireless network, the first group of mobile stations being assigned a first group portion of a downlink subframe and the second group of mobile stations being assigned a second group portion of the downlink subframe, the method performed by the mobile station comprising:

determining whether synchronization with a second group portion of a downlink subframe has been lost; and performing the following when synchronization with the second group portion has not been lost:

transmitting data in a second group portion of an uplink subframe which at least partially overlaps with a first group portion of the downlink subframe; and receiving a downlink control information of a second group portion of the downlink subframe;

performing the following when synchronization with the second group portion is determined to be lost:

receiving a downlink control information of the first group portion of the downlink subframe, the downlink control information of the first group portion including a group boundary information identifying a location of a group boundary between the first group portion and the second group portion or identifying a location or resources of the second group portion, wherein a group boundary between the first group portion and the second group portion of the downlink subframe is variable; and determining an updated location or resources of a downlink control information of the second group portion, based on the downlink control information of the first group portion; and receiving the downlink control information of the second group portion based on the updated location of the downlink control information of the second group portion that was determined from the downlink control information of the first group portion.

* * * * *